(12) United States Patent
Xu et al.

(10) Patent No.: US 11,952,445 B2
(45) Date of Patent: Apr. 9, 2024

(54) ETHYLENE/ALPHA-OLEFIN COPOLYMERS FOR BETTER OPTICAL AND MECHANICAL PROPERTIES AND PROCESSABILITY OF FILM MADE THEREFROM

(71) Applicant: Formosa Plastics Corporation, USA, Livingston, NJ (US)

(72) Inventors: Guangxue Xu, Port Lavaca, TX (US); Zhiming Wang, Port Lavaca, TX (US); Chih-Jian Chen, Port Lavaca, TX (US); Honglan Lu, Port Lavaca, TX (US)

(73) Assignee: Formosa Plastics Corporation, USA, Livingston, NJ (US)

( * ) Notice: Subject to any disclaimer, the term of this patent is extended or adjusted under 35 U.S.C. 154(b) by 0 days.

(21) Appl. No.: 17/533,776

(22) Filed: Nov. 23, 2021

(65) Prior Publication Data
US 2022/0153886 A1    May 19, 2022

Related U.S. Application Data

(63) Continuation of application No. 15/982,567, filed on May 17, 2018, now abandoned.

(51) Int. Cl.
*C08F 210/16*   (2006.01)
*C08F 4/02*   (2006.01)
*C08F 4/16*   (2006.01)
*C08F 4/6192*   (2006.01)
*C08F 4/64*   (2006.01)

(52) U.S. Cl.
CPC ............ *C08F 210/16* (2013.01); *C08F 4/022* (2013.01); *C08F 4/16* (2013.01); *C08F 4/6192* (2013.01); *C08F 4/64* (2013.01); *C08F 2500/01* (2013.01); *C08F 2500/04* (2013.01); *C08F 2500/11* (2013.01); *C08F 2800/20* (2013.01)

(58) Field of Classification Search
CPC .......... C08F 210/16; C08F 4/022; C08F 4/16; C08F 4/6192; C08F 4/64
See application file for complete search history.

(56) References Cited

U.S. PATENT DOCUMENTS 5,210,167 A    5/1993  Firdaus et al.
5,258,345 A   11/1993  Kissin et al.
(Continued)

OTHER PUBLICATIONS

Dartora, Paula Cristina, Ruth Marlene Campomanes Santana, and Ana Cristina Fontes Moreira. "The influence of long chain branches of LLDPE on processability and physical properties." Polímeros 25 (2015): 531-539.

(Continued)

*Primary Examiner* — Catherine S Branch
(74) *Attorney, Agent, or Firm* — Spencer Fane, LLP

(57) ABSTRACT

A Ziegler-Natta catalyzed ethylene/alpha-olefins copolymer is provided having sporadic long chain branches and reversed comonomer composition distribution or short chain branching distribution (SCBD) in the high molecular weight fractions. According to the invention, polyethylene film made with the inventive copolymer has a balance of improved physical, optical, mechanical properties as well as processability. In one aspect, the film includes a 1% secant modulus of greater than 25,000 psi, a film haze of less than 10, a film clarity of greater than 90, a dart impart resistance of greater than 500 g/mil, and a MD tear strength of greater than 500 g/mil.

20 Claims, 5 Drawing Sheets

(56) References Cited

U.S. PATENT DOCUMENTS

| | | | |
|---|---|---|---|
| 5,258,449 | A | 11/1993 | Firdaus et al. |
| 5,550,094 | A | 8/1996 | Ali et al. |
| 6,043,326 | A | 3/2000 | Sillantaka et al. |
| 7,618,913 | B2 | 11/2009 | Xu et al. |
| 8,475,899 | B2 | 7/2013 | Yang et al. |
| 8,546,499 | B2 | 10/2013 | Garroff et al. |
| 8,993,693 | B2 | 3/2015 | Lu et al. |
| 9,487,608 | B2 | 11/2016 | Lu et al. |
| 2006/0100401 | A1 | 5/2006 | Martin et al. |

OTHER PUBLICATIONS

Sukhadia, Ashish M., et al. "Optical Haze Properties of Polyethylene Blown Films: Part 2—The Origins of Various Surface Roughness Mechanisms." Presented at SPE ANTEC. 2001.

Voronkov, M. G., Mileshkevich, V. P. and Yu, A. "The siloxane bond—physical properties and chemical transformations. Plenum Publishing Corporation, New York, 1978."

Wild, L., et al. "Determination of branching distributions in polyethylene and ethylene copolymers." Journal of Polymer Science: Polymer Physics Edition 20.3 (1982): 441-455.

Janzen, J., and R. H. Colby. "Diagnosing long-chain branching in polyethylenes." Journal of Molecular Structure 485 (1999): 569-583.

ETHYLENE/ALPHA-OLEFIN COPOLYMERS FOR BETTER OPTICAL AND MECHANICAL PROPERTIES AND PROCESSABILITY OF FILM MADE THEREFROM

CROSS REFERENCE TO RELATED APPLICATION

This application is a continuation of U.S. application Ser. No. 15/982,567, filed on May 17, 2018, which is incorporated by reference herein in its entirety.

BACKGROUND OF THE INVENTION

Field of the Invention

The present invention relates to polyethylene copolymers with sporadic long chain branches and high molecular weight tail along with a reversed comonomer distribution for improving processability, melt strength, and optical properties, while maintaining excellent dart impact and tear strengths. More specifically, the present invention relates to linear low density polyethylene (LLDPE) with uniform compositions, which is obtainable by copolymerization of ethylene with $C_3$- to $C_{10}$-alpha-olefins in the presence of a special Ziegler-Natta catalyst system.

Description of the Related Art

Various types of polyethylene are known in the art. Low density polyethylene (LDPE) is generally prepared at high pressure using free radical initiators and typically has a density in the range of 0.9100-0.9400 g/cc. High density polyethylene (HDPE) usually has a density in the range of 0.9400 to 0.9600 g/cc, which is prepared with Ziegler-Natta type catalysts or single-site type catalysts (such as metallocene catalysts) at low or moderate pressures. HDPE is generally polymerized without comonomer, or alternatively with a small amount of comonomers with fewer short chain branches (SCB) than LLDPE. Linear low density polyethylene (LLDPE) is one of the ethylene/alpha-olefins copolymers, generally prepared in the same manner as HDPE, except it incorporates a relatively higher amount of alpha-olefin comonomers such as 1-butene. 1-hexene or 1-octene.

LLDPE copolymers have short branches along the main chain due to the units derived from the alpha-olefin comonomers. These comonomer or branches distribution along the polymer chain are crucial because it influences the properties of the copolymer resin which, in turn, determine its applicability for commercial LLDPE products. For example, a good comonomer distribution ensures the achievement of an ethylene copolymer having a density sufficiently lower than HDPE, while controlling the amount of fractions soluble in hydrocarbon solvent (like hexane or xylene) that worsen certain properties of the said copolymers, such as increasing the blocking phenomenon observed in rolls of LLDPE film. By narrowing molecular weight distribution, lowering the density of LLDPE, improving branching or comonomer distribution, reducing low molecular weight extractable fractions (the short chain branching content in high molecular weight fractions are desirable), tear strength, impact strength, puncture resistance, toughness, and clarity properties of films from LLDPE resins are significantly improved.

Transition metal catalyst systems, including Ziegler-Natta catalysts, metallocene catalysts, and other single-site catalysts, are widely used for producing LLDPE in slurry, gas phase, or solution processes. The catalyst composition used for producing linear low density polyethylene (LLDPE) determines the properties of the polymers. Thus, the catalyst composition allows for tailoring molecular structure and properties of the polymer resins.

Conventional Ziegler-Natta catalyzed polyethylene copolymers, such as LLDPE, have both a relatively broad molecular weight distribution and a relatively broad comonomer distribution. As such, comonomers are predominately incorporated into the low molecular weight polymer molecules or short polyethylene chains, whereas the long polyethylene chains or high molecular weight polymer molecules do not contain a meaningful amount of comonomers. In other words, the conventional Ziegler-Natta catalyzed ethylene copolymers exhibit a heterogeneous SCB distribution among polymer chains of different molecular weight. This lack of compositional homogeneity is associated with several disadvantages including "organoleptic" problems caused by low molecular weight material and suboptimal impact strengths, which are believed to be caused by the crystallinity of the homopolymer fraction. Therefore, conventional Ziegler-Natta catalyzed LLDPE exhibiting a broad composition distribution and broad molecular weight distribution is known to have good processability as measured by extruder pressures and motor load. In film applications, conventional Ziegler-Natta catalyzed LLDPE (ZN LLDPE) exhibits good physical properties as related to tensile and tears (MD tear and TD tear) strengths, but shows low dart drop impact strength and puncture strength and clarities.

Metallocene or single-site catalysts normally produce resins with a narrow composition distribution in which comonomers are substantially uniformly distributed among the polymer chains of different molecular weight. Metallocene or single-site catalyzed LLDPE (mLLDPE), having a narrow composition distribution and narrow molecular weight distribution, is known to produce tough films with high dart impact and puncture resistance and excellent optical properties. But the metallocene or single-site catalyzed LLDPE exhibits adverse processability and weak film tensile properties (e.g. MD tear strength). In addition, it is difficult to apply metallocene or single site catalysts in existing polymerization processes without major process modification and capital investment. This is because the solubility of organometallic compounds and cocatalysts, such as methylaluminoxane (MAO), requires costly immobilization processes on inorganic supports to obtain good operability while maintaining acceptable catalyst activity in a supported metallocene system.

As such, advanced Ziegler-Natta catalyst and its compositions have already widely attracted the industry's attention. It is desirable that advanced Ziegler-Natta catalyst can produce ethylene copolymer and LLDPE having properties of both conventional ZN-made LLDPE and metallocene-made mLLDPE. Specifically, it is highly desirable to attain polyethylene resins that exhibit ZN LLDPE type processability and a tear strength that is higher than or equivalent to ZN LLDPE, but with a dart impact strength and optical property comparable to or better than that of mLLDPE.

U.S. Pat. Nos. 5,258,345 and 5,550,094 disclose a Ziegler-Natta catalyst system, which comprises a silica supported catalyst precursor and an activator of dimethylaluminum chloride (DMAC), for producing LLDPE polymers with a bimodal MWD, particularly those containing a high molecular weight fraction. The catalyst precursor is prepared by contacting a carrier (such as silica) with an organomagnesium compound (such as dibutylmagnesium) to incorporate magnesium into the carrier, and then treating the carrier in sequence with a silicon compound, a transition metal compound, and an organomagnesium compound. The precursor can be activated with DMAC or a mixture of DMAC and a trialkylaluminum compound. However, DMAC alone as activator shows relatively low activity and alpha olefin oligomerization, which may foul a gas phase fluidized bed polymerization reactor. High ratio of DMAC to trialkylaluminum (30:1 to 300:1) is required to achieve broad molecular weight distribution and maintain high molecular weight tail. U.S. Pat. Nos. 5,210,167 and 5,258,449 report the film properties of the LLDPE polymers made from this catalyst precursor activated with DMAC or with diethylaluminum chloride (DEAC)/tri(n-hexyl)aluminum (TnHAL) pretreatment and DMAC activation. The LLDPE polymer films contain a significant portion of high molecular weight components with an $M_z/M_w$ ratio of greater than 3.5, and exhibit improved optical properties and impact properties. However, the dart impact strength is still much lower than that from typical m-LLDPE polymers. The other polymer properties, such as comonomer compositional distribution, MD tear strength, and processability, such as melt pressure and melt strength, are not mentioned.

U.S. Pat. Nos. 6,043,326 and 8,546,499 disclose a process for copolymerizing ethylene and alpha-olefins using a halogen compound based procatalyst and a cocatalyst from a 1:1 mixture of TEAL/EADC or TEA/DEAC. The procatalyst is prepared by depositing an alkyl metal chloride (a product from a branched aliphatic monoalcohol and Mg dialkyl), a chlorine-containing Ti compound ($TiCl_4$), onto an inorganic support, such as EADC treated silica. Relatively high Al/Ti ratio (>15) is needed for achieving decent polymerization activity and productivity and large amount of chain transfer agent ($H_2$) required for regulating molecular weight of the product. The resulting LLDPE polymers show more uniform comonomer composition distribution profile across the molecular weight distribution, compared to LLDPE produced without using a halogenated cocatalyst. However, there is no mention of the processability and melt strength, physical properties (dart impact and tear strengths), and optical properties (haze, clarity and gloss) of the product.

Accordingly, a new catalyst and/or process is needed having good process operability and high polymerization activity, and for producing LLDPE polymers which have the merits of both ZN LLDPE and m-LLDPE, such as desirable molecular weight and molecular weight distribution, as well as uniform comonomer composition distribution, which provide blown films with desirable physical properties such as high MD tear and dart impart strengths, excellent optical properties, and good processability. Idea polymer composition has unique features and then thereby produce the blown films having processability that better than or equal to ZN catalyzed LLDPE, and a MD tear strength that is higher than super-hexene ZN LLDPE and dart impact strength that is on a par with m-LLDPE.

Assignee's prior patents, such as U.S. Pat. Nos. 7,618,913, 8,993,693, and 9,487,608, describe a highly active supported Ziegler-Natta catalyst system with a nitrogen-based electron donor for producing unique ethylene copolymer. Both catalyst component and a prepolymerized catalyst component, activating with trialkylaluminum compound, produce ethylene-based polymer or co-polymer (LLDPE) having a narrower molecular weight distribution, a more uniform comonomer composition distribution, and better mechanical properties, such as dart impact and tear strengths. The blown films from the said LLDPE polymer show a MD tear strength that is higher than super-hexene ZN LLDPE and dart impact strength in par with m-LLDPE. Fractionation analysis of the LLDPE polymer showed that high molecular weight fractions with $M_w$>300,000 g/mol have flat comonomer composition distribution. However, the intrinsic viscosity of these fractions conforms to the Mark-Houwink equation, indicating only linear structure exists in these high MW fractions. The linear and very high molecular weight polymer chains tend to form thicker crystallization lamella and causes rough surface for blown films. Accordingly, the optical properties with haze of films made with the LLDPE polymer need to be further improved to compete with those from an advanced m-LLDPE or ethylene/1-octene copolymer (C8-LLDPE), made by solution process. The optical properties limit their specific applications for high clarity films. In addition, the non-linear structure with a given amount of long chain branching is desirable for improving rheological behavior and processability of polymer. For example, the melt strength of the said polymer is not sufficient for specific applications requiring certain extensional flow properties during processing, such as blow molding and geomembrane application.

Thus, there is still further demand for development of linear low density polyethylene (LLDPE) showing more constant comonomer composition distribution profiles across the MWD (the comonomer content of the copolymer does substantially not decrease with increasing molecular weight, compared to state of prior art LLDPEs) and/or even showing an upward comonomer composition profile across the MWD (the comonomer content of the copolymer increases as the molecular weight of the polymer chains increases). In addition, such polyethylene copolymers have sporadic long chain branches and high molecular weight tail along with a reversed comonomer distribution. Such LLDPEs should have a substantially constant distribution of molecular weight profile across the chemical composition distribution or polymer fractions, meaning that molecular weight is more constant, respectively flat, from soluble and/or insoluble fractions over elution temperature range from 30° C. to 130° C.

SUMMARY OF THE INVENTION

It is therefore an object of the present invention to provide a linear low density polyethylene with improved properties, such as molecular weight, comonomer composition distribution, amount of CRYSTAF soluble polymer fraction and density, amount of long chain branching and its distribution, and high molecular weight tail and chain entanglement with a reversed comonomer distribution. In particular, the object of the invention is to provide an improved comonomer composition distribution, improved molecular weights of individual polymer fractions, comonomer contents in different polymer chains, and side chain distribution in single polymer chains. More specifically, the object of the present invention is to tune the microstructure of the polymer component for tailoring polymer properties, where the polymer microstructure includes crystallizing polymer component (fraction) distribution by Crystallization Analysis Fractionation (CRYSTAF) and Temperature Rising Elution Fractionation (TREF), molecular weight and molecular weight distribution, comonomer composition distribution, and the long chain branching content in low molecular weight and high molecular weight fractions, and molecular weight and comonomer distribution in high molecular weight tail. Ethylene/alpha-olefin copolymer or linear low density polyethylene (LLDPE) with such desirable microstructure provides the corresponding blown films with improved processability, enhanced melt strength, and improved optical properties comparable to mLLDPE and C8 LLDPE, while maintaining higher MD tear strength than super-hexene ZN LLDPE and superior dart impact strength on par with m-LLDPE.

What is disclosed is a Ziegler-Natta catalyst composition comprising a special procatalyst containing titanium, magnesium, chlorine, electron donors and silane compounds, supported on a particulate inorganic carrier, and a halogenated aluminum alkyl or organohalogenous aluminum compound as cocatalyst for the production of the ethylene/alpha-olefins copolymers, according to the teachings of the present invention.

In one embodiment of the present invention, a Ziegler-Natta catalyzed ethylene/alpha-olefins copolymer or linear low density polyethylene is provided having the following properties:

density, according to ASTM D1505-98, of between 0.890 and 0.935 g/cc;

C4-C10 comonomer content, determined by Fourier transform infrared spectroscopy, of between 1 and 20 wt %;

melt index ($I_2$), according to ASTM D1238, of between 0.5 and 10 dg/min;

ratio ($M_z/M_w$) of z-average molecular weight (Mz) to weight average molecular weight (Mw) of between 3.0 and 10;

melting point of the copolymer is over 124° C. across the density of from 0.890 to 0.935 g/cc;

sporadic long chain branches with J-C α value (LCB per $10^6$ total carbon atoms) of less than 5.

melt strength index, defined as the ratio of storage modulus to loss modulus (G'/G") at a shear rate of 0.03 $s^{-1}$, is from 0.1 to 5.

weight average molecular weight Mw, determined by gel permeation chromatography, of less than 200,000 g/mol, a fraction soluble at a temperature below 30° C. of at least 12 wt %, determined by CRYSTAF, having a weight average molecular weight Mw, determined by gel permeation chromatography, of higher than 90,000 g/mol, and a fraction between 60 and 75° C. of less than 35 wt % and Greater than 13.5 wt % of a polymer component having an elution temperature below 30° C., determined by temperature rising elution fractionation (TREF) analysis;

Greater than 15 wt % of a polymer component having an elution temperature below 40° C. (average high molecular weight of about or higher than 90,000 g/mol);

Greater than 10 wt % of a polymer component having an elution temperature range from 30° C. to 60° C.;

Less than 50 wt % of a polymer component having an elution temperature range from 60° C. to 94° C.;

Greater than 25 wt % of a polymer component having an elution temperature higher than 94° C.;

Greater than 5 wt % of a polymer component (average high molecular weight of higher than 150,000 g/mol) having an elution temperature range from 100° C. to 130° C.;

a substantially constant distribution of short chain branching profile across its molecular weight distribution (MWD) in each fraction over the elution temperature range from 30° C. to 100° C., determined by Gel Permeation chromatography coupled with Fourier transform infrared spectroscopy detector (GPC-FTIR); and a high molecular weight tail in the fractions over the elution temperature range from 100° C. to 130° C. and a reversed distribution of comonomer composition profile across the molecular weight distribution, determined by Gel Permeation chromatography coupled with Fourier transform infrared spectroscopy detector (GPC-FTIR).

The ethylene/alpha-olefin copolymer or linear low density polyethylene according to certain teachings of the present invention is prepared by copolymerizing ethylene with one or more C4-C10 comonomer in the presence of a special Ziegler-Natta catalyst system comprising:

A) a precursor prepared by contacting [A1] a magnesium-based composite support, in-situ prepared by contacting metallic magnesium with alkyl halide or aromatic halide in the presence of an organic silicon compound having the formula $R^1_m Si(OR^2)_n$, wherein $R^1$ and $R^2$ are $C_1$-$C_{20}$ hydrocarbyl, m=0-3, n=1-4, and m+n=4, and wherein each $R^1$ and each $R^2$ may be the same or different, with [A2] a compound having the formula $R^3_x SiX_y$, wherein $R^3$ is $C_1$-$C_{20}$ hydrocarbyl, X is halogen, x=0-3, y=1-4, and x+y=4, and wherein each X and each $R^3$ may be the same or different, [A3] a compound having the formula $MX_4$, wherein M is an early transition metal such as Ti, [A4] a compound having the formula $M(OR^4)_a X_{4-a}$, wherein M is an early transition metal such as Ti, wherein $R^4$ is $C_1$-$C_{20}$ hydrocarbyl, X is halogen, and 0≤a≤4, [A5] a substituted aromatic compound containing nitrogen such as 2,6-dimethylpyridine and 8-quinolinol and 2-methyl-8-quinolinol, and [A6] an alkyl halide or aromatic halide compound having the formula $R^5 X$, wherein $R^5$ is $C_1$-$C_{20}$ hydrocarbyl.

B) a cocatalyst, which is preferably a halogenated aluminium alkyl or organohalogenous aluminum compound prepared in-situ by reacting alkyl aluminum and/or alkylaluminoxane with halogenated alkylaluminum compound.

In another embodiment of the present invention, the ethylene/alpha-olefin copolymer or linear low density polyethylene is prepared by copolymerizing ethylene with one or more C4-C10-comonomer in the presence of a prepolymerized catalyst. The prepolymerized catalyst composition is one type of prepolymer prepared by (co)polymerizing ethylene and/or alpha olefins in the presence of (A) a Ziegler-Natta catalyst and (B) cocatalyst, which is preferably a halogenated aluminium alkyl and/or an organohalogenous aluminum compound obtained in-situ by reacting alkylaluminoxane with halogenated alkylaluminum compounds. The said prepolymer has an amount ranging from 0.1 to 1000 g per g of the solid catalyst precursor, being characterized by its sporadic long chain branches in the high molecular weight fractions and an improved comonomer response for the copolymerization of ethylene and alpha-olefin without using additional co-catalyst.

In yet another embodiment, a polyethylene film is made with the ethylene/alpha-olefin copolymer or linear low density polyethylene in accordance with certain teachings of the present invention, having a balance of improved physical, optical, mechanical properties as well as improved processability. The film includes a 1% secant modulus of greater than 25,000 psi, a film haze of less than 10, a film clarity of greater than 90, a dart impart resistance of greater than 500 g/mil, and a MD tear strength of greater than 500 g/mil.

DETAILED DESCRIPTION OF THE INVENTION

Figure 1:
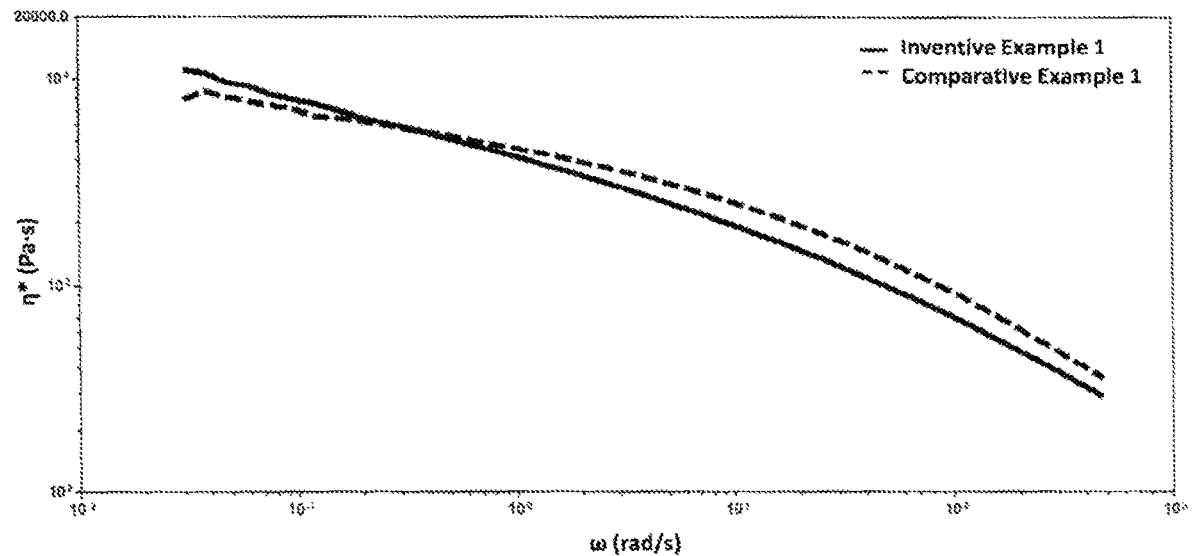
FIG. 1 depicts rheological curves for Inventive Example 1 and Comparative Example 1.

The catalyst composition and polymerization process of the present invention provides for the production of ethylene/alpha-olefin copolymer or linear low density polyethylene (LLDPE) with the above described "tailored" and "fine-tuned" polymer microstructure and properties. In particular, the catalyst composition of the present invention allows for producing such ethylene copolymers with improved properties such as comonomer composition distribution, short chain branching distribution, high molecular weight tail, long chain branching content in polymer chain (fraction), and molecular weight and molecular weight distribution in each fraction over elution temperature.

The inventors have found that comonomer composition distribution (CCD) and short chain branching distribution (SCD) have positive effects on polymer properties, such as optical properties, crystallinity, toughness, and many other properties. The polymers according to the present invention show balanced/improved comonomer composition distribution and short chain branching distribution. In particular, a substantially constant distribution of short chain branching profile across its molecular weight distribution (MWD) in each fraction over the elution temperature range from 30° C. to 100° C. can be reached. Moreover, a high molecular weight tail in the fractions over elution temperature range from 100° C. to 130° C. and a reversed distribution of comonomer composition profile across the molecular weight distribution can be obtained by using the catalyst composition of the present invention.

It has been discovered that molecular weight, molecular weight distribution, and short chain branching distribution of soluble fraction eluted below a temperature of 40° C. are critical to polymer properties such as toughness (dart impact), MD tear strength, and blocking properties or cling properties. The polymer according to the present invention contains at least 13.5 wt % of a soluble fraction eluted below a temperature of 30° C., and at least 15 wt % of a soluble fraction eluted below a temperature of 40° C. These fractions have both a narrow molecular weight distribution, a high molecular weight greater than about 100,000 g/mol, and a constant or reversed distribution of comonomer composition profile across the molecular weight distribution, which are similar to other fractions eluted from 40° C. to 100° C. It is believed that this unique polymer features in the soluble fraction eluted below 40° C. is associated to toughness (dart impact resistance), MD tear strength, tensile strength, and cling properties.

To improve the melt strength and processability and optical properties, it is desirable that the polymer of the present invention should have a higher ratio of average viscosity molecular weight (Mz) to average weight molecular weight (Mw), while maintaining the above-mentioned polymer features and polymer composition. In particular, high molecular weight tail or bump is more desirable. The polymer according to the present invention contains a high molecular weight tail, together with $M_z/M_w$ ratio of greater than 3.5. In U.S. Pat. Nos. 5,258,345 and 5,550,094 and 5,210,167 and 5,258,449 disclosed a Ziegler-Natta catalyst system comprising a silica-supported catalyst precursor and an activator of dimethylaluminum chloride (DMAC) for producing LLDPE polymers with a bimodal MWD and a high molecular weight tail. However, catalyst systems in these prior arts demonstrate very low activity, the polymer produced thereof contain alpha olefin oligomer (low molecular weight fraction) that may foul a gas phase fluidized bed polymerization reactor. U.S. Pat. Nos. 5,210,167 and 5,258,449 disclosed the film properties of the LLDPE polymers with improved optical properties and dart impact resistance. Due to soluble fraction containing low molecular weight and non-even short chain branching distribution in the polymer, therefore, the dart impact strength and MD tear strength are still much lower than super-hexene or typical m-LLDPE polymers. This is indication that polymer composition in these prior arts is significant from polymer composition in this invention as mentioned above.

Moreover, long chain branching in polyethylene polymer also has an influence on polymer properties, such as crystallization kinetics, crystal structure, relaxation time, melt elasticity, optical properties (haze, clarity, and gross), processability, melt strength, polymer viscosity and rheology behavior, and output rate in film production as well. Chromium-based catalysts and metallocene-based catalysts can produce polymers with long chain branching content therein, while titanium-based Ziegler-Natta catalyst rarely create long chain branching in the polymer chain. Chromium-based catalyst produces polymer having very broad molecular weight distribution and very high amount of long chain branching in polymer, which leads to poor toughness and weak MD tear strength and high haze, although there is excellent processability and melt strength. Some metallocene-based catalyst systems (i.e., U.S. Patent Application No. 2006/0100401A1) demonstrate that the metallocene composition and polymerization methods therein provide ethylene polymers with long chain branch in the polymer chain, which can improve haze and clarity in the blown film while minimizing impact on other properties such as dart impact. However, MD tear strength of polymer is much lower than Ziegler-Natta catalyzed ethylene copolymer due to too much long chain branch content therein in the polymer. U.S. Pat. No. 8,475,899 disclosed a metallocene-based process for producing broad molecular weight distribution polymers with a reverse comonomer distribution and low levels of long chain branches less than 8 per $10^6$ total carbon atoms, and less than about 5% by weight of the polymer eluted below a temperature of 40° C. There is no data to show that polymer with low levels of long chain branches therein have better film optical properties and toughness, together with mechanical properties improvement such as MD tear strength. On the other hand, the composition disclosed in U.S. Pat. No. 8,475,899 is much different from that provided in this invention, based on TREF analysis.

The optical improvement (haze decrease and clarity increase) is observed with increasing melt elasticity in LLDPE films, either by addition of branched molecules or high molecular weight molecules. However, the introduction of LCB does not appear to provide an improvement for both processing and film performance, long chain branch in polymer can improve film optical properties, processability and bubble stability, but will decrease Elmendorf MD tear strength, as suggested in the literatures: for examples, Paula Cristina Dartora, Ruth Marlene Campomanes Santana, and Ana Cristina Fontes Moreira, "The influence of long chain branches of LLDPE on processability and physical properties", *Polimeros* 26 (6), 2015; Ashish M. Sukhadia, David C. Rohlfing, Garth L. Wikes, and Matthew B. Johnson, "Optical haze properties of polyethylene blown films: Part 2—the origins of various surface roughness mechanisms", SPE ANTEC 2001 May 6-10; each of which is incorporated herein by reference. Therefore, it is believed that there is an optimum level of LCB in polymer chain that improves both processing and properties (i.e., optical properties and MD tear resistance). It was found in this invention that level of long chain branches less than 1 per $10^6$ total carbon atoms has positive influence to improve both mechanical properties such as MD tear strength and optical properties as well.

In order to tailor LLDPE polymer composition with the desirable microstructures, including short chain branching distribution, molecular weight distribution, high molecular weight in the fraction eluted over temperature from 20° C. to 40° C., high molecular weight tail, and low level of long chain branches less than 1 per $10^6$ total carbon atoms in the polymer composition, we further improve the catalyst system and develop a compatible polymerization process through which catalyst and polymerization process morphology and flowability is improved, operation efficiency of producing LLDPE polymers with lower density could be enhanced without issues of reactor fouling, catalyst activity and catalyst productivity could be enhanced, and the above-mentioned microstructure of the LLDPE polymers could be tuned. The ethylene/alpha-olefins copolymer or linear low density polyethylene of the present invention is made with an advanced magnesium-based catalyst precursor, and/or a special ethylene prepolymerized catalyst component, a process for preparing the ethylene prepolymer from the catalyst precursor, and a process for making such polyethylene copolymers.

The present invention includes a process to produce ethylene (co)polymers that includes reacting at least the following components with each other:
(a) an advanced Ziegler-Natta catalyst precursor comprising Ti, Mg, Si, halogen and nitrogen.
(b) a cocatalyst comprising a halogenated aluminum alkyl or organohalogenous aluminum compounds prepared in-situ by reacting alkyl aluminum and/or alkylaluminoxane with halogenated alkylaluminum compound;
(c) ethylene, and
(d) one or more alpha-olefins copolymerizing with ethylene, being characterized in that the organohalogenous aluminum compound is in-situ prepared by reacting alkyl aluminium and/or alkylaluminoxane with halogenated alkylaluminum during (co)polymerization.

The present invention also includes another process to produce the ethylene copolymer, comprising reacting of at least the following components with each other:
(a) a prepolymer (prepolymerized catalyst component) prepared from the polymerization of ethylene with or without one or more alpha-olefins, optionally under hydrogen, in the presence of (i) an advanced Ziegler-Natta catalyst precursor comprising Ti, Mg, Si, halogen and nitrogen, and (ii) an activator comprising a halogenated aluminum alkyl or organohalogenous aluminum compounds produced by reacting alkyl aluminum and/or alkylaluminoxane with halogenated alkylaluminum compound;
(b) ethylene, and
(c) one or more alpha-olefins copolymerizing with ethylene without a co-catalyst in the presence of hydrogen.

In yet another embodiment, the resins of the present invention exhibit a unique composition which provide the corresponding blown films with improved processability, bubble stability, enhanced melt strength, and improved optical properties equal or comparable to mLLDPE and C8 LLDPE, while maintaining outstanding MD tear strength higher than ZN catalyzed LLDPE or super-hexene ZN LLDPE and superior dart impact strength on par with m-LLDPE.

Catalyst Component and its Preparation

The catalyst precursor discussed above is prepared by the following reaction, as depicted schematically and described in detail as follows:

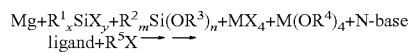

$Mg + R^1_xSiX_y + R^2_mSi(OR^3)_n + MX_4 + M(OR^4)_4 + N\text{-base ligand} + R^5X \longrightarrow$

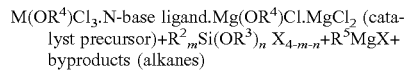

$M(OR^4)Cl_3 \cdot N\text{-base ligand} \cdot Mg(OR^4)Cl \cdot MgCl_2$ (catalyst precursor) $+ R^2_mSi(OR^3)_n\ X_{4-m-n} + R^5MgX +$ byproducts (alkanes)

Firstly, an organic silicon complex is prepared in situ by reacting alkoxysilane ester, $R^2_mSi(OR^3)$, with halogen-substituted silane, $R^1_xSiX_y$. The reaction is preferably conducted in the presence of magnesium and halogenated alkyl group, such as alkyl chloride, which, without being limited to this position, is believed to form alkyl magnesium halide. The mixture is heated for 30 to 60 minutes, preferably 45 to 60 minutes, in a non-polar solvent to about 50 to 100° C., preferably to about 65 to 85° C.

The reactions between alkoxysilane ester with halogen-substituted silane such as silicon tetrachloride ($SiCl_4$) are described by M. G. Voronkov, V. P. Mileshevich, and A. Yu in the book "The Siloxane Bond", Plenum Publishing Corp., New York, 1978. The reaction can be carried out in a non-polar solvent by heating the mixture to about 50 to 100° C., preferably to about 65° C. to 85° C. The duration of heating is not generally critical. One acceptable procedure is to heat for about 30 to 60 minutes once the desired temperature is obtained. The molar ratio of alkoxysilane ester to halogen-substituted silane is from about 0.5 to 3.0, and more preferably from about 0.8 to 1.5. Some percentage of the alkoxysilane ester may remain in excess and thus, not reacted, in the final organic silicon product. The organic silicon product can be and preferably is used in the next steps in situ without further separation or characterization.

The halogen-substituted silane has the formula $R^1_xSiX_y$ where $R^1$ is a $C_1$-$C_{20}$ hydrocarbyl, which for present purposes includes both unsubstituted and substituted species, including halogen substituted species, X is halogen, x is 0-3, y is 1-4, and x+y=4. More than one halogen X may be employed in the halogen-substituted silane. Suitable halogen-substituted silane compounds include, but is not limited to, silicon tetrachloride, tetrabromosilane, tetrafluorosilane, benzyltrichlorosilane, bis(dichlorosilyl)methane, 2-bromoethyltrichlorosilane, t-butyldichlorosilane, t-butyltrichlorosilane, 2-(carbomethoxy)ethyltrichlorosilane, 2-chloroethylmethyl dichlorosilane, 2-chloroethyltrichlorosilane, 1-chloroethyltrichlorosilane, chloromethylmethyldichlorosilane, ((Chloromethyl)phenylethyl)trichlorosilane, chloromethyltrichlorosilane, 2-cyanoethylmethyldichlorosilane, cyclohexyltrichlorosilane, cyclopentyltrichlorosilane, cyclotetraemethylenedichlorosilane, cyclotrimethylenedichlorosilane, 1,5-dichlorohexamethyltrisiloxane, (dichloromethyl)trichlorosilane, dichlorosilane, 1,3-dichlorotetramethyldisiloxane, diethyoxydichlorosilane, ethylmethyldichlorosilane, ethyltrichlorosilane, heptyltrichlorosilane, hexachlorodisilane, hexachlorodisiloxane, isobutyltrichlorosilane, methyltrichlorosilane, octyltrichlorosilane, pentyltrichlorosilane, propyltrichlorosilane, and trichloromethyltrichlorosilane. It is preferred to employ tetrachlorosilane, allyltrichlorosilane, ethyltrichlorosilane, methyltrichlorosilane, or dichlorodiphenylsilane.

Suitable alkoxysilane ester compounds have the formula $R^2_m Si(OR^3)_n$. $R^2$ and $R^3$ are independently selected from any $C_1$-$C_{20}$ hydrocarbyl, which for present purposes includes both unsubstituted and substituted species, including halogen substituted species, m is 0-3, n is 1-4, and m+n=4. More than one hydrocarbyl or substituted hydrocarbyl group may be employed as the $R^2$ component, and more than one hydrocarbyl or substituted hydrocarbyl group may be employed as the $R^3$ component. Suitable alkoxysilane ester compounds include, but is not limited to, tetramethoxysilane, tetraethoxysilane, tetraisopropoxysilane, tetrapropoxysilane, tetraethoxysilane, tetraisobutoxysilane, tetraphenoxysilane, tetra(p-methylphenoxy)silane, tetrbenzyloxysilane, tetrakis(2-methoxyethoxy)silane, tetrakis(2-ethylhexoxy)silane, tetraallyloxysilane, methyltrimethoxysilane, methyltriethoxysilane, mehtyltributoxysilane, methyltriphenoxysilane, ethyltriethoxysilane, ethyltriisobutoxysilane, ethyltriphenoxysilane, allyltrimethoxysilane, octadecyltrimethoxysilane, octadecyltriethoxysilane, octyltriethoxysilane, phenyltrimethoxysilane, phenyltriethoxysilane, benzyltriphenoxysilane, methyltrialllyloxysilane, dimethyldimethoxysilane, dimethyldiethoxysilane, dimethyldiisopropyloxysilane, dimethyldibutoxysilane, dimethyldihexyloxysilane, dimethyldiphenoxysilane, diethyldiethoxysilane, diethyldiisobutoxysilane, diethyldiphenoxysilane, dibutyldiisopropyloxysilane, dibutyldibutoxysilane, dibutyldiphenoxysilane, diisobutyldiethoxysilane, diisobutyldiisobutoxysilane, diphenyldimethoxysilane, diphenyldiethoxysilane, diphenyldibutoxysilane, dibenzyldiethoxysilane, divinyldiphenoxysilane, diallyldipropoxysilane, diphenyldiallyoxysilane, 1,1,1,3,3-pentamethyl-3-acetoxydisiloxane, triethoxysilane, trimethoxysilane, triethoxychlorosilane, and trimethoxychlorosilane. Particularly preferable compounds are tetramethoxysilane, tetraethoxysilane, tetraisopropoxysilane, tetrapropoxysilane, tetrabutoxysilane, tetraisobutoxysilane, or combinations thereof.

Secondly, the organic silicon complex or organic silicon complex containing nitrogen is contacted with a transition metal compound, preferably a titanium compound, to form an organic silicon complex containing transition metal. The molar ratio of silicon complex to the titanium compound is preferably from about 0.1 to 3.0, and more preferably from about 0.5 to 2.0. The reaction is preferably conducted at 80° C., and the duration of heating may be from about 30 to 60 minutes, preferably about 40 minutes. Once the desired temperature is obtained, the reaction generates an organic silicon complex containing transition metal, which is typically a brown product when titanium is employed. The organic silicon complex containing transition metal can be used, and desirably is used, for the following steps in situ without further separation or characterization.

The transition metal compounds that are acceptable for this process include alkoxytitanium halide compounds having the formula $Ti(OR^4)_4 X_{4-n}$. $R^4$ is a $C_1$-$C_{20}$ hydrocarbon, X is a halogen, and $0 \leq n \leq 4$. For present purposes, $R^4$ may be unsubstituted or substituted, including halogen substituted. Each $R^4$ may be the same or different. The titanium compound $Ti(OR^4)_4 X_{4-n}$ may be prepared in situ prepared by reacting a titanium halide compound with $Ti(OR^4)_4$ and/or $Ti(OR^4)_3 X$ or by reacting corresponding alcohol, $R^4 OH$, with a titanium halide compound. Alternatively, $Ti(OR^4)_4 X_{4-n}$ may be formed before addition to the reactor by preconditioning a titanium halide compound with $Ti(OR^4)_4$, $Ti(OR^4)_3$ or $R^4 OH$. Preconditioning may be achieved by mixing a titanium halide compound in hexane with $Ti(OR^4)_4$ or $Ti(OR^4)_3$ in hexane and stirring at about 75° C. to 80° C. for about 0.5 to 1 hour, resulting in a $Ti(OR^4)_4 X_{4-n}$ complex.

Examples of the titanium halide compound include $TiCl_4$, $TiBr_4$, $TiI_4$, $TiCl_3 \cdot nTHF$ and $3TiCl_3 \cdot AlCl_3$. Among these titanium halides, $TiCl_4$ and $3TiCl_3 \cdot AlCl_3$ are preferred. Titanium compounds with the structural formula $Ti(OR^4)_4$ or $Ti(OR^4)_3 X$ include, but are not limited to, trimethoxymonochlorotitanium, triethoxyfluorotitanium, triethoxychlorotitanium, tetraethoxytitanium, tripropoxyfluorotitanium, tripropoxychlorotitanium, tetra-n-propoxytitanium, tetraisopropoxytitanium, tributoxyfluorotitanium, tributoxychlorotitanium, triisobutoxychlorotitanium, tetra-n-butoxytitanium, tetra-isobutoxytitanium, dipentoxydichlorotitanium, tripentoxymonochlorotitanium, tetra-n-pentyloxytitanium, tetracyclopentyloxytitanium, trioctyloxymonochlorotitanium, 2-ethylhexoxytitanium trichloride, butoxytitanium trichloride, tetra-n-hexyloxytitanium, tetracyclohexyloxytitanium, tetra-n-heptyloxytitanium, tetra-n-octyloxytitanium, tetra-2-ethylhexyloxytitanium, tri-2-ethylhexyloxymonochlorotitanium, tetranonyloxytitanium, tetradecyloxytitanium, tetraisobornyloxytitanium, tetraoleyloxytitanium, tetraallyloxytitanium, tetrabenzyloxytitanium, tetrabenzohydryloxytitanium, triphenoxytitanium, tetr-o-methylphenoxytitanium, tetraphenoxytitanium, tetra-o-methylpheoxytitanium, tetra-m-mehtylpheoxytitanium, tetra-o-methylphenoxytitanium, tetra-m-methylphenoxytitanium, tetra-1-naphthyloxytitanium, tetra-2-napthyloxytitanium and mixtures thereof. The preferred $Ti(OR^4)_4$ or $Ti(OR^4)_3 X$ compounds are 2-ethylhexoxytitanium trichloride, butoxytitanium trichloride, tetra-n-propoxytitanium, tetraisopropoxytitanium, tetra-n-butoxytitanium, tetraisobutoxytitanium, dibutoxydichlorotitanium, isobutoxytrichlorotitanium and propoxytrichlorotitanium.

Thirdly, the organic silicon complex containing titanium is further contacted with a substituted aromatic ring nitrogen compound to form a complex containing Si—Ti—N compounds. The substituted aromatic ring nitrogen compound is preferably employed in amounts sufficient to have a molar ratio of substituted aromatic ring nitrogen compound to transition metal compound as added in the previous processing step of typically from about 0.010:1 to 50:1, preferably from about 0.02:1 to 10:1, and most preferably from about 0.1:1 to 5:1. Although the conditions are not generally critical, one acceptable procedure is to heat at about 80° C.

for about 30 to 100 minutes, preferably about 60 minutes. Once the desired temperature is obtained, the reaction generates a complex with dark brown color. The said complex can be used, and preferably is used, for the next steps in situ without further separation or characterization.

The N-base ligand compounds as an electron donor is a substituted aromatic ring nitrogen compound, and can be selected from the substituted pyrimidine, dipyridyl, pyrazine, terpyridine and quinoline compounds. Representative examples of the compounds include, but are not limited to, 2,6-dimethylpyridine, 2,6-diisopropylpyridine, 2,6-di-tert-butylpyridine, 2,4,6-trimethylsilylpyridine, 2,6-dimethoxypyridine, 2,6-bis(chloromethyl)-pyridine,2,2':6',2'-terpyridine, 2,2'-dipyridyl, 6,6'-dimethyl-2,2'-dipyridyl, 2,2'-diquinolyl, 4-(p-tolyl)-2,2':6',2"-terpyridine, 2,6-dimethypyrazine, 2,3,5-trimethylpyrazine, 2,4,6-trimethyl-s-triazine, 2,3,5,6-tetramethylpyrazine, quinaldine, pyrimidine, pyrazine, pentafluoropyridine, pentachloropyridine, 2,4,6-trimethylpyrimidine, 3-methylpyridazine, 2,6-dimethylpyridazine, 2,6-pyridinecarboxylic acid, 2,6-pyridinediacetate, 2,6-pyridinecarbonyl dichloride, 2,6-pyridinecarboxaldehyde, 2,6-pyridinedicarboxamide, 2,6-pyridinedimethanol, 2,6-pyridinediethanol, 2,6-diacetylpyridine, 2,6-bis(chloromethyl)pyridine, 2,6-bis(bromomethyl)pyridine, 2,6-pyridinecarbonitrile, quinoline, 2-quinolinecarbonitrile, 2-quninolinecarboxaldehyde, 4-quinolinecarbixaldehyde, quinoline-7-carbaldehyde, quninoline-8-methanol, 4-quinolinol, 5-quinolinol, 8-quinolinol, and mixture thereof. The most preferred example is 2,6-dimethylpyridine and 8-quinolinol and 2-methy-8-quinolinol.

Lastly, the Mg-based composite support catalyst precursor can be obtained by further contacting the complex containing Si—Ti—N compounds with the in-situ yielded Mg-based composite support for about 3 to 4 hours. Specifically, the magnesium halide composite support is in situ prepared by reacting metallic magnesium with an alkyl halide or aromatic halide in the presence of the complex containing Si—Ti—N compounds at a temperature of about 75° C. to 90° C., preferably about 75° C. to 80° C. The molar ratio of alkyl or aromatic halide to metallic magnesium is about 1.0 to 3.5, preferably about 1.2 to 2.0. The ratio of the complex containing Si—Ti—N compounds to metallic magnesium is about 0.01 to 1.5, and preferably about 0.05 to 0.5. Any type of magnesium powder may be used as the metallic magnesium source. Suitable alkyl or aromatic halides have the formula $R^5X$ wherein $R^5$ is an alkyl group typically containing 3 to 20 carbon atoms or an aromatic group typically containing 6 to 18 carbon atoms and X is a halogen, typically chlorine or bromine. Examples of alkyl or aromatic halides include, but are not limited to, butyl chloride and chlorobenzene.

The magnesium/titanium-based catalyst precursor is prepared in a non-polar solvent. Suitable non-polar solvents are materials in which all of the reactants used herein, e.g., the silicon compound, the transition metal compound, and electron donors, are at least partially soluble and in liquid state at reaction temperatures. Preferred non-polar solvents are saturated hydrocarbons and include, but a rot limited to, alkanes, such as iso-pentane, hexane, heptane, octane, and decane. A nitrogen atmosphere may be used to prevent exposure to air. The catalyst precursor may be stored in a slurry state under nitrogen for further pre-polymerization or dried into powder for further pre-polymerization or gas phase polymerization.

The catalyst precursor described above contains Ti, Mg, Si, halogen and nitrogen elements, has good morphology and narrow particle size distribution and unique flowability. The catalyst precursor is then activated by cocatalyst to form the catalyst system of the present invention.

Cocatalyst and its Composition

The cocatalyst of the present invention are aluminum compounds including, but not limited to, dimethyl aluminum chloride (DMAC), diethyl aluminum chloride (DEAC), diisobutyl aluminium chloride, ethyl aluminum dichloride (EADC), ethylaluminium sesquichloride (EASC), methyl aluminum dichloride, triethylaluminium (TEAL), and alkylaluminoxane or mixtures therefrom, or an organohalogenous aluminum compound in-situ prepared by reacting alkyl aluminum and/or alkylaluminoxane with halogenated alkylaluminum compounds.

Alkylaluminoxane, such as methylaluminoxane (MAO), have been widely used to activate metallocene catalysts or single-site catalysts for producing m-LLDPE, but have not been employed to activate Ziegler-Natta catalyst in the prior art. Rather, halogenated alkylaluminum compounds including DMAC, DEAC, EADC, and EASC have been used to activate Ziegler-Natta catalyst. As is well known in the art, when using halogenated alkylaluminum compounds as cocatalyst, Ziegler-Natta catalysts demonstrate very low activity. When using a combination of halogenated alkylaluminum compound, such as EADC and triethyl aluminum (TEAL) as described in U.S. Pat. Nos. 6,043,326 and 8,546,499, it was found that $SiO_2$-based Ziegler-Natta catalysts have good activity, improved short chain branching distribution, and reduced soluble extraction. However, the prior art fails to address the processability and melt strength, physical properties (dart impact and tear strengths), and optical properties (haze, clarity and gloss) of the product. More importantly, when using a combination of halogenated alkylaluminum compound such as EADC and triethyl aluminum (TEAL) in the present invention, it was discovered that the composition of ethylene/alpha-olefins copolymer or linear low density polyethylene is much different from that reported in U.S. Pat. Nos. 6,043,326 and 8,546,499, according to analysis from CRYSTA and TREF techniques. Moreover, the Ziegler-Natta catalyzed ethylene/alpha-olefins copolymer of the present invention has sporadic long chain branches and reversed comonomer composition distribution or short chain branching distribution (SCBD) in the low-soluble fraction at elution temperature of 30° C. and high molecular weight tail (fraction) obtained from an elution temperature range from about 100° C. to 130° C. The composition of ethylene/alpha-olefins copolymer or linear low density polyethylene provided in this invention is also substantially different from that reported in assignee's prior patents, such as U.S. Pat. Nos. 8,993,693, and 9,487,608.

Preferred cocatalysts of the present invention are EASC or EADC or DEAC, which can be used alone as a pure cocatalyst or more preferably in combination with triethyl aluminium (TEAL) and/or methylaluminoxane (MAO).

If triethyl aluminium (TEAL) and/or methylaluminoxane (MAO) are used in combination with EASC or EADC or DEAC, it is believed an organohalogenous compound may be in-situ produced by reacting alkyl aluminium or alkylaluminoxane with halogenated alkylaluminum compounds, which is used as cocatalyst in Ziegler-Natta catalysts, the corresponding polymer prepared has a sporadic long chain branches in high molecular weight fractions and a high molecular weight tail along with reversed comonomer composition distribution for improving processability, melt strength and optical properties.

When alkylaluminoxane is mixed with halogenated alkylaluminum, it is generally believed that a typical reaction to produce the organohalogenous aluminum compound as cocatalysts is described in the following equation:

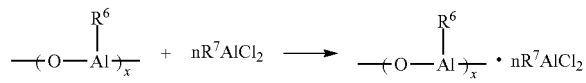

wherein the alkylalumoxane may be oligomeric linear and/or cyclic alkylaluminoxanes, $R^6$ is $C_1$-$C_{20}$ hydrocarbyl, which for present purposes includes both unsubstituted and substituted species, including substituted species with halogen, alkoxide and hydride, and x is 1-40, preferably about 3-20. The representative example of alkylaluminoxane is selected from methylalumoxane, modified methylalumoxane, tetraethyldialumoxane, tetrabutylalumoxane, bis(diisobutylaluminum) oxide, ethylalumoxane, isobutylalumnoxane, polymethylalumoxane, and mixtures or combinations thereof. The alkylaluminoxane is preferably modified methylalumoxane.

$R^7$ is $C_1$-$C_{20}$ hydrocarbyl, which for present purposes includes both unsubstituted and substituted species, including substituted species with halogen, alkoxide and hydride; n is typically 0.05 to 20, preferably 0.5 to 2. The mixing temperature between the alkyalumoxane and alkylaluminium dichloride is typically from about –10° C. to 85° C., and preferably from about 20° C. to 60° C. The suitable alkylaluminum dihalides include, but is not limited to, methylaluminum dichloride, ethylaluminum dichloride, isobutylaluminum dichloride, isobutylaluminum dichloride, t-butylaluminum dichloride and amylaluminum dichloride, and ethylaluminum dichloride. The preferred alkylaluminum dihalide is ethylaluminium sesquichloride.

The alkylaluminum dihalide may be prepared in situ via the reaction between aluminum trihalide and dialkylaluminum halide. The suitable aluminum trihalide includes, but is not limited to, aluminum trichloride, aluminum tribromide and aluminum triiodide. Aluminum trichloride is the preferred aluminum trihalide. Suitable examples of dialkylaluminum are dimethylaluminum chloride, diethylaluminium chloride, diisobutylaluminum chloride, di(t-butyl)aluminum chloride, and diamylaluminum chloride. Diethylaluminum chloride is the preferred dimethylaluminum chloride.

The alkylaluminum dihalide may also be prepared in situ via the reaction between alkene and dihaloaluminum hydride. A suitable dihaloaluminum hydride is selected from dichloroaluminum hydride, dibromoaluminum hydride, and diiodoalumminum hydride, preferably dichloroaluminum hydride. Examples of alkenes include 1 to 20 alkyl group with or without substitute species of halogen, alkoxide and hydride.

The modified methylalumoxane and ethylaluminum dichloride is preferably used for in-situ preparing the aforementioned organohalogenous aluminum compounds as cocatalyst. In one embodiment of the present invention, the cocatalysts could be mixed prior to adding to the supported catalyst component for activation. In another embodiment, the cocatalysts could separately be added to the supported catalyst component for activation. It is particularly advantageous to prepare the organohalogenous aluminum compounds by reacting the organic aluminum compounds and the catalytically halogen organic aluminum compounds less than about 2 hours, and preferably less than about 1 hour, before starting the copolymerization. The molar ratio of alkylaluminoxane to halogenated alkylaluminum compounds is about 0.1 to 3. The preferable ratio of alkyl aluminium or alkylaluminoxane to halogenated alkylaluminum compounds is about 0.5 to 1.5, preferably about a 1:1 ratio.

The supported catalyst precursor is then activated with organohalogenous aluminum compounds as cocatalyst (in-situ produced by reacting alkyl aluminium or alkylaluminoxane with halogenated alkylaluminum compounds) to form a catalyst system of the present invention. The cocatalyst is typically used in excess of the transition metal compound. The molar ratio of the aluminum in the cocatalyst to the titanium is from about 1 to 500 mol/mol, preferably from about 1 to 100 mol/mol, more preferably from about 2 to 50 mol/mol, and most preferably from about 2 to 20 mol/mol. The catalyst component may be activated in situ by adding the cocatalyst and catalyst component separately to the polymerization medium. It is also possible to combine the catalyst precursor and cocatalyst before their introduction into the polymerization medium, for example for about 2 hours or less and at a temperature from about –10° C. to 85° C., and preferably from about 20° C. to 60° C. In addition, catalyst component may be activated in situ by adding the cocatalyst and component separately to the polymerization medium in the presence of ethylene to a special prepolymerized catalyst component, which can be used as catalyst composition in the slurry or gas phase polymerization with or without additional cocatalysts used thereafter.

Preparation of Ethylene Prepolymer or Prepolymerized Catalyst Component

The supported catalyst precursor, after activation with organohalogenous aluminum compounds (combination of alkyl aluminium or alkylaluminoxane with halogenated alkylaluminum compounds) may be subjected to prepolymerization in the presence of olefin, and produce an ethylene prepolymer or prepolymerized catalyst component, which is sequentially used for the gas phase polymerization. For example, the solid catalyst precursor and a cocatalyst component, such as an organohalogenous aluminum compound, are contacted with an olefin. Examples of the olefin used for the prepolymerization are ethylene, propylene, 1-butene, and 1-hexene. The prepolymerization may be either homopolymerization or copolymerization. It may be preferable to make a slurry containing the solid catalyst precursor using a solvent. Examples of suitable solvents include aliphatic hydrocarbons such as butane, pentane, hexane, heptane, and aromatic hydrocarbons such as toluene and xylene, preferably hexane. The cocatalyst amount is crucial for the kinetic and reactivity control. The organohalogenous aluminum compound may be used in a ratio of about 0.1 to 100, preferably about 0.5 to 50, calculated as the Al/Ti atomic ratio, that is, the atomic ratio of the Al atom in the organohalogenous aluminum compound to the Ti atom in the solid catalyst component. The preferred ratio is about 2 to 10. Hydrogen is an important factor affecting the prepolymerization activity and the molecular weight (or MI) control of the ethylene prepolymer. The ratio of hydrogen to ethylene may typically be about 0.01 to 10.0, and preferably about 0.05 to 1.0. The hydrogen could be charged either at the beginning of reaction or continually during the reaction. The temperature for the prepolymerization may generally be –30° C. to 100° C., and preferably from –10° C. to 85° C. The prepolymerization temperature is another factor for kinetics and MI control of the ethylene prepolymer. Large temperature fluctuations during the prepolymerization should be avoided. The temperature fluctuation may typically be controlled within ±5.0° C., preferably within ±0.5° C. The prepolymerization time relates to the particle size and the yield of the ethylene prepolymer produced. The yield and particle size may increase with prolonged prepolymerization time. The typical prepolymerization time may be from about 0.5 to 20 hours, and preferably from about 1 to 12 hours. The yield of said ethylene prepolymer ranges from about 0.1 to 1000 g per g of said solid catalyst precursor, and preferably from about 1.0 to 500 g per g of said solid catalyst precursor. For gas phase fluidized polymerization, the ethylene prepolymer has a yield ranging from about 20 to 160 g per mmol Ti of said solid catalyst precursor.

When used for gas phase polymerization, the ethylene prepolymer may be combined with inert diluents to form a slurry, or dried to obtain a free-flowing powder. The drying temperature is typically from about 30° C. to 80° C., and preferably from about 40° C. to 60° C. The average particle size of the ethylene prepolymer is typically from about 100 to 500 micron, more preferably from about 200 to 300 micron. In addition, small amounts of fine particles (<80 micron) may also be produced. The typical fine particle content is from about 2 to 30%, and preferably from about 5 to 12%. High content of fine particles in the ethylene prepolymer could bring about issues of high static and hot spots, and should be avoided in the gas phase polymerization. The MI or $I_2$ of the ethylene prepolymer is typically from about 0.02 to 100 g/10 min, and preferably from about 0.5 to 5 g/10 min. The solid powder of the ethylene prepolymer can be stored under nitrogen for a relatively long period time, typically from about two weeks to a month, and maintain good activity in the following slurry or gas phase polymerization.

The advantage of using the prepolymer instead of the catalyst precursor directly for gas phase polymerization includes: a) the improvement in the morphology of the catalyst with less fine particle content, which may increase the particle flowability, inhibit the otherwise dramatic initial activity, and facilitate the catalyst to be used for gas phase polymerization in a fluidized bed reactor or stirring bed reactor; b) the ability of tuning the microstructure of the polymer or copolymer produced, such as comonomer composition distribution, molecular weight distribution, high molecular weight fraction (tail) and long chain branching, to the desirable level for tailoring properties of the polymer product.

Copolymerization of Ethylene and Alpha-Olefin with Ethylene Prepolymer or Prepolymerized Catalyst Component Ethylene and alpha-olefins may be copolymerized with the ethylene prepolymer by any suitable process. Such processes include polymerizations carried out in slurry, in suspension, in solution, or in gas phase. A preferred method for producing LLDPE resins is a gas phase process, including stirred bed reactors and fluidized bed reactors.

Standard polymerization conditions for production of polyolefin polymers by the method of the present invention, such as the polymerization temperature, polymerization time, polymerization pressure, monomer concentration and hydrogen concentration should be selected. Typically, the polymerization temperature should be below the sintering temperature of polymer particles for gas phase polymerization. For the production of ethylene copolymers, an operating temperature of about 30° C. to 115° C. is acceptable, about 50° C. to 100° C. is preferred, and about 75° C. to 95° C. is more preferred. Temperatures of about 75° C. to 90° C. are preferably used to prepare LLDPE products having a density of 0.90 to 0.92 g/mL; temperatures of about 80° C. to 100° C. are preferably used to prepare LLDPE products having a density of 0.92 to 0.94 g/mL; and temperatures of about 90° C. to 115° C. are used to prepare LLDPE products having a density of 0.94 to 0.96 g/mL. Molecular weight of the polymers may be suitably controlled with hydrogen when the polymerization is performed using the catalyst system of the present invention described herein. The control of molecular weight may be illustrated by changes in melt indexes ($I_2$ and $I_{21}$) of the polymer.

Copolymerizing the alpha-olefin comonomers with ethylene to achieve about 1 to 5 mol percent of the comonomer in the copolymer results in the desired density ranges in the copolymers. The amount of the comonomer needed to achieve this result will depend on the particular comonomer(s) employed. It has been found that when using a gas phase catalytic polymerization reaction, 1-butene, 1-hexene and 4-methyl-1-pentene can be incorporated into ethylene-based copolymer chains with high efficiency. A relatively small concentration of 1-butene, 1-hexene or 4-methyl-1-pentene in the gas phase reactor can lead to a relatively large incorporation of 1-butene, 1-hexene or 4-methyl-1-pentene into the resulting copolymer. For example, 1-butene, 1-hexene or 4-methyl-1-pentene in an amount up to about 18 percent by weight, preferably about 2 to 12 percent by weight, may produce LLDPE resins having a density of less than 0.940 g/mL.

LLDPE resins may be copolymers of ethylene with one or more $C_3$-$C_{10}$ alpha-olefins. Thus, copolymers having two types of monomer units are possible as well as terpolymers having three types of monomer units. Particular examples of such polymers include, but are not limited to, ethylene/1-butene copolymers, ethylene/1-hexene copolymers, ethylene/4-methyl-1-pentene copolymers, ethylene/propylene/1-butene terpolymers, ethylene/propylene/1-hexene terpolymers, ethylene/1-butene/1-hexene terpolymers. Particularly preferred comonomers are 1-hexene, 4-methyl-1-pentene, propylene, 1-butene, and mixtures thereof.

Polymer Characterization

Density was measured according to ASTM D1505-98. The copolymer produced in accordance with the present invention may have a density of about 0.960 g/mL or less, preferably about 0.952 g/mL or less, or more preferably about 0.940 g/mL or less. In accordance with certain aspects of the present invention, it is possible to achieve densities of less than about 0.910 g/mL and even as low as about 0.870 g/mL. Copolymer resins produced in accordance with the present invention preferably contain at least about 75 percent by weight of ethylene units. Preferably, the copolymer resins of the present invention contain at least about 0.5 weight percent, for example, from about 0.5 to 25 weight percent of an alpha-olefin.

The molecular weight of the copolymers may be controlled in a known manner, preferably by using hydrogen. With the catalysts produced according to the present invention, molecular weight may be suitably controlled with hydrogen when the polymerization is carried out at temperatures from about 20 to 300° C. This control of molecular weight may be evidenced by a measurable positive change of the melting index ($I_2$). Melt flow index (MI) of the polymer was measured at 190° C., according to ASTM D1238. Melt flow ratio (MFR), which is the ratio of high melt flow index (HLMI or $I_{21}$) to melt index (MI or $I_2$), was used as measure of melt fluidity and a measure of the molecular weight distribution.

The molecular weight distribution (MWD) of the polymers prepared according to the present invention, as expressed by the MFR values, varies from about 10-40. MFR is the ratio of the high-load melt index (HLMI or $I_{21}$) to the melt index (MI or I2) for a given resin (MFR=$I_{21}/I_2$). The ethylene/1-hexene copolymer having a density of about 0.910 g/mL to 0.930 g/mL, in a preferred embodiment, has a melt index ratio ($I_{21}/I_2$) of between about 20 and 30.

Molecular weights and molecular weight distribution were measured by Gel Permeation Chromatography (GPC). The polymers of the present invention have a molecular weight distribution, a weight average molecular weight to number average molecular weight ($M_w/M_n$), of from about 2.5 to 80, preferably from about 2.5 to 4.5, more preferably from about 3.0 to 4.0, and most preferably from about 3.2 to 3.8. The polymers have a ratio ($M_z/M_w$) of z-average molecular weight ($M_z$) to weight average molecular weight of greater than about 2.5. In one embodiment, this ratio is from about 2.5 to 3.8. In yet another embodiment, this ratio is from about 2.5 to 3.5. The ratio of z-average molecular weight to weight average molecular weight ($M_z/M_w$) reflects inter- and/or intra-macromolecular entanglement and unique polymer rheological behavior.

Molecular weight measurements were carried out using a high temperature size exclusion chromatograph (SEC) (Polymer Char) equipped with a differential refractive index (DRI) and infrared (IR) (PolyChar, IR4) detectors, a Viscotek model 210R viscometer, and a multi-angle laser light scattering (MALLS) apparatus (Wyatt, DAWN EOS). All measurements were taken at 145° C. using 1,2,4-trichlorobenzene (TCB) as the solvent. The system was calibrated with a standard material (NBS 1475) with a weight-average molecular weight of 52000 g/mol and an intrinsic viscosity of 1.01 dL/g. The refractive index increment, dn/dc, was calculated from the calibrated DRI detector as 0.11 mL/g. Molecular weights for the polyethylene polymers of the present invention were calculated from the intrinsic viscosity detector using the following Mark-Houwink parameters; K=$4.5 \times 10^{-4}$ dL/g and a=0.735, established for linear polyethylene from a polystyrene calibration.

SEC with the multiple detectors can detect differences between the hydrodynamic volume of linear and branched polymers. Simultaneous measurement of intrinsic viscosity [η], and absolute molecular weight, $M_{LS}$, for each fraction of polymer separated by the chromatography columns can provide information about the structure of branched polymers. Mark-Houwink plots (log[η] vs log[$M_w$]) for each slice of the SEC elution, can be used to qualitatively observe branching. The linear standard polyethylene polymers behave in a fashion described by the Mark-Houwink relation: [η]=$KM^a$, where K and a can be obtained from the slope and intercept of the Mark-Houwink plot. However, branched polymers begin to deviate from linear behavior at high molecular weights, that is, the slopes of the Mark-Houwink plot for the branched polymer deviate from that of the linear standard. The deviation from linear behavior is subtle at low branch point density but became more apparent as branch point density is increased. In accordance with certain teachings of the present invention, this deviation from linear behavior is observed in the high molecular weight fractions of the inventive samples, that is, the inventive samples have long branched polymer chains. In contrast, the comparative samples conform to the linear relationship of Mark-Houwink plot in all the molecular weight fractions, indicating they do not contain any long chain branching in the polymers. SCBD data can be obtained using a SEC-FTIR high temperature heated flow cell (Polymer Laboratories) as reported in the literature (P. J. DesLauriers, D. C. Rohlfing, and E. T. Hsieh, Quantifying short chain branching microstructures in ethylene 1-olefin copolymers using size exclusion chromatography and Fourier transform infrared spectroscopy (SEC-FTIR) Polymer, 2002, 43, 159).

Analytical Temperature Rising Elution Fractionation (TREF) technique was carried out on a PolyChar TREF 200+ instrument. 40 mg of polymer sample and 20 mL of 1,2,4-trichlorobenzene were sequentially charged into the vessel to dissolve the polymer. Then, an aliquot of the resulting polymer solution was loaded on the column and cooled at 0.5° C./min to 35° C. Afterward, the elution began using a 0.5 mL/min flow rate and heating at 1° C./min up to 140° C.

Comonomer distribution breadth index (CDBI), defined as the weight percent of the ethylene copolymer having a comonomer content within 50 percent of the median total molar comonomer content, can be calculated by the data obtained from TREF, as described in the literature (L. Wild., T. R. Ryle, D. C. Knobeloch, and I. R. Peat, Determination of branching distributions in polyethylene and ethylene copolymers J. Polym. Sci. Polym. Phys. Ed., 1982, 20, 441).

CRYSTAF is a fully automated instrument intended for the fast measurement of the Chemical Composition Distribution (CCD) in Polyolefins. CRYSTAF instrument performs the Crystallization Analysis Fractionation technique to separate the polymer by its comonomer content. The polymer is initially dissolved in an appropriate solvent at an increased temperature, and then the temperature of solution is reduced very slowly resulting in gradual crystallization of the polymer. The process is done in a single temperature ramp (crystallization step), while the polymer solution concentration is monitored by using the Infrared Detector IR4 of Polymer Char. CRYSTAF can be converted into a CRYSTAF-TREF combined system capable of running both techniques by using the same hardware. Each technique can provide complementary information on the CCD in some complex resins.

Copolymer Compounding/Extrusion and LLDPE Pellets

The copolymers produced in accordance with the present invention may also be blended with additives to form compositions that can then be used in articles of manufacture. Those additives include antioxidants, nucleating agents, acid scavengers, plasticizers, stabilizers, anticorrosion agents, blowing agents, other ultraviolet light absorbers such as chain-breaking antioxidants, etc., quenchers, antistatic agents, slip agents, pigments, dyes and fillers and cure agents such as peroxide. These and other common additives in the polyolefin industry may be present in polyolefin compositions from about 0.01 to 50 wt % in one embodiment, and from about 0.1 to 20 wt % in another embodiment, and from about 1 to 5 wt % in yet another embodiment.

In particular, antioxidants and stabilizers such as organic phosphites and phenolic antioxidants may be present in the polyolefin compositions from about 0.001 to 5 wt % in one embodiment, and from about 0.02 to 0.5 wt % in yet another embodiment. Non-limiting examples of organic phosphites that are suitable include tris(2,4-di-tert-butylphenyl)phosphite (IRGAFOS 168) and tris(nonyl phenyl)phosphite (WESTON 399). Non-limiting examples of phenolic antioxidants include octadecyl 3,5-di-t-butyl-4-hydroxyhydrocinnamate (IRGANOX 1076) and pentaerythrityl tetratris(3,5-di-tert-butyl-4-hydroxyphenyl)propionate (IRGANOX 1010); and 1,3,5-tri(3,5-di-tert-butyl-4-hydroxybenzyl-isocyanurate (IRGANOX 3114).

Fillers and fatty acid salts may also be present in the polyolefin including LLDPE composition. Filler may be present from about 0.1 to 65 wt % in one embodiment, and from about 0.1 to 45 wt % of the composition in another embodiment, and from about 0.2 to 25 wt % in yet another embodiment. Desirable fillers include, but are not limited to, titanium dioxide, silicon carbide, silica (and other oxides of silica, precipitated or not), antimony oxide, lead carbonate, zinc white, lithopone, zircon, corundum, spinel, apatite, Barytes powder, barium sulfate, magnesiter, carbon black, dolomite, calcium carbonate, talc and hydrotalcite compounds of the ions Mg, Ca, or Zn with Al, Cr or Fe and $CO_3^-$ and/or $HPO_4$, hydrated or not; quartz powder, hydrochloric magnesium carbonate, glass fibers, clays, alumina, and other metal oxides and carbonates, metal hydroxides, chrome, phosphorous and brominated flame retardants, antimony trioxide, silica, silicone, and blends thereof. These fillers may particularly include any other fillers and porous fillers and supports known in the art.

Fatty acid salts may be present from about 0.001 to 6 wt % of the composition in one embodiment, and from about 0.01 to 2 wt % in another embodiment. Examples of fatty acid metal salts include lauric acid, stearic acid, succinic acid, stearyl lactic acid, lactic acid, phthalic acid, benzoic acid, hydroxystearic acid, ricinoleic acid, naphthenic acid, oleic acid, palmitic acid, and erucic acid, suitable metals including Li, Na, Mg, Ca Sr, Ba, Zn, Cd, Al, Sn, Pb and so forth. Preferred fatty acid salts include magnesium stearate, calcium stearate, sodium stearate, zinc stearate, calcium oleate, zinc oleate, and magnesium oleate.

In the physical process of producing the blend of polyolefin and one or more additives, sufficient mixing should take place to assure that a uniform blend will be produced prior to conversion into a finished product. The polyolefin can be in any physical form when used to blend with the one or more additives. In one embodiment, reactor granules, defined as the granules of polymer that are isolated from the polymerization reactor, are used to blend with the additives. The reactor granules have an average diameter of from about 10 μm to 5 mm and from about 50 μm to 10 mm in another embodiment. Alternately, the polyolefin is in the form of pellets, such as, for example, having an average diameter of from 1 mm to 6 mm that are formed from melt extrusion of the reactor granules.

One method of blending the additives with the polyolefin is to contact the components in a tumbler or other physical blending means, the polyolefin being in the form of reactor granules. This can then be followed, if desired, by melt blending in an extruder. Another method of blending the components is to melt blend the polyolefin pellets with the additives directly in an extruder, Brabender or any other melt blending means.

Rheological tests were carried out on compression molded disk of the polymer pellets in an ARES-G2 Rheometer (TA Instrument) using parallel plate geometry. Small strain (3%) dynamic mechanical experiments were performed at 190° C. in a nitrogen atmosphere. The resulting complex viscosity as a function of imposed oscillatory frequency ($|\eta^*|$ vs. ω) was then curve fitted with modified three parameter Carreau-Yasuda (CY) empirical model:

$$|\eta^*(\omega)| = \eta_o / [1 + (\tau_\eta \omega)^a]^{(1-n)/a},$$

to obtain the zero shear viscosity ($\eta_o$), characteristic viscous relaxation time ($\tau_\eta$) and the breadth parameter (a). Due to the limitation of the measurement range, n is taken as 0.1818 based on theoretical value. (Graessley W. W. Viscosity of Entangling Polydisperse Polymer, *J. Chem. Phys.* 1967, 47, 1942-1953)

The Janzen-Colby model was used for characterizing the long chain branching effect on polymer melt viscosity (J. Janzen and R. H. Colby, Diagnosing long-chain branching in polyethylenes, *Journal of Molecular Structure* 1999, 485-486, 569-584). The long chain branch content (vertexes per a million carbons) was denoted as J-C α value. For the cases with polymer dispersity of >2.0, a small correction based on Yau's article (Wallace W. Yau, A rheology theory and method on polydispersity and polymer long-chain branching, *Polymer* 2007, 48, 2362-2370) was also required to offset the effect of molecular weight breadth.

The date of storage modulus (G') and loss modulus (G") as a function of shear rate (y) can also be obtained using Cox-Merz rule. Melt strength index (MSI), defined as the ratio of storage modulus and loss modulus (G'/G") at a shear rate of 0.03 $s^{-1}$, is used as an empirical parameter for evaluating melt quality in the film blowing process. In accordance with the present invention, MSI value is between about 0.01 and 0.80.

Film Extrusion and Film Properties

The polymers produced according to the present invention are more easily extruded into film products by cast or blown film processing techniques as compared to commercial octene-1 LLDPE and commercial mLLDPE (I) with comparable melt index and density. The resins in this invention have, for a comparable MI, a MWD narrower than 1-hexene copolymer resins but broader than mLLDPEs. The resins made from this invention also exhibit a molecular structure, such as comonomer composition distribution, similar to typical mLLDPE resins.

More specifically, in the present invention, the compounded polymer resins are extruded through a single screw laboratory extruder and blown into film under the following conditions: BUR=2.5:1, gauge=1 mil, melt temperature=425° F. Film dart impact (g/mil) was tested by ASTM D-1709, and film Elmendorf Tear (g/mil) by ASTM D-1922 and secant modulus by ASTM D-882, film haze by ASTM D-1003, film clarity by ASTM D-1746, and gloss by ASTM D-2457.

EXAMPLES

In order to provide a better understanding of the foregoing discussion, the following non-limiting examples are offered. Although the examples may be directed to specific embodiments, they are not to be viewed as limiting the invention in any specific respects.

Catalyst Preparation (a) Preparation of Catalyst Precursor

Catalyst precursor was synthesized as described in U.S. Pat. No. 7,618,913, adapted to the present invention as follows:

Anhydrous hexane (2 L), magnesium (31.9 g), iodine (3.3 g), 2-methyl-1-propanol (5.0 mL), titanium propoxide (7.2 mL) and butyl chloride (5.0 mL) were successively charged into a 5 L reactor equipped with an anchor stirrer driven by a magnetic motor. The reactor was heated to 85° C. within 45 minutes and then cooled to 80° C. within 30 minutes. Tetraethoxy orthosilicate (20 mL) and silicon tetrachloride (38 mL) were added to the reactor and held at 80° C. for 40 minutes to yield a yellow-brown reaction product in the suspension. Next, titanium propoxide (38.9 mL) and TiCl$_4$ (18.3 mL) were charged to the suspension at 80° C., and the slurry mixture was stirred for 0.5 hour to yield organic silicon complex containing titanium, followed by the slow introduction of 2,5-dimethylpyridine (20.0 mL) in the suspension. Then n-butyl chloride (230 mL) was added at the rate of 0.96 mL/min and held for 4 hours. The reaction was continuously stirred at 80° C. for 3 hour to yield a brown/yellow reaction product. The suspension was cooled to 50° C., resulting in a brownish precipitate, which was subsequently washed 3 times with 2 L hexane at 50° C. Drying the precipitate led to a solid magnesium-based supported titanium catalyst precursor. Analysis shows that the supported catalyst precursor composition contains 7.5 wt % Ti, together with composition of Si, Mg, Cl, and N elements.

(b) Preparation of Ethylene Prepolymer or Prepolymerized Catalyst Component

A typical process for preparing prepolymer is as follows: Two liters of n-hexane, 60 mmoles of EADC (or EASC), 60 mmol MAO (or TEAL) and a quantity of the catalyst precursors containing 12.6 mmoles of titanium were subsequently introduced into a 5 liter stainless steel reactor under nitrogen atmosphere, provided with a stirring device rotating at 750 rpm and heated to 68° C. Hydrogen was then introduced to obtain a partial pressure of 0.5 bar, and ethylene was introduced at a steady flow rate of 160 g/h for 1-3 hours. Subsequently, the reactor was degassed and its contents were transferred into a flask evaporated in which the hexane was removed under vacuum followed by nitrogen heating to 40-50° C. After evaporation, 160-480 g of prepolymer containing 40-120 g polyethylene per mmoles of titanium was obtained as an ethylene prepolymer (based on polymerization process). The prepolymer was stored under nitrogen and would be used for the sequential slurry or gas phase polymerization.

(c) Gas Phase Copolymerization of Ethylene and 1-Hexene

Catalyst precursor is directly charged to slurry or gas phase polymerization reactor, together with the cocatalyst, a halogenated aluminium alkyl or organohalogenous aluminum compounds prepared in-situ by reacting alkyl aluminium and/or alkylaluminoxane with halogenated alkylaluminum compound. Catalyst precursor was in-situ activated and then used for copolymerization of ethylene with alpha-olefins including 1-hexene.

Alternatively, catalyst precursor is activated first with the cocatalyst, a halogenated aluminium alkyl or organohalogenous aluminum compounds, in the presence of ethylene and hydrogen to produce prepolymerized catalyst component (or prepolymer) with approximate particle size (as described above). The prepolymerized catalyst component (or prepolymer) then is directly used in slurry or gas phase polymerization without additional cocatalyst thereafter for copolymerization of ethylene with alpha-olefins.

With reference to Table 1, Examples 1-6 are ethylene/1-hexene copolymers produced by using lab-scaled gas phase reactor in accordance with the following general procedure. Co-polymerization was carried out in an autoclave designed for stirred gas phase polymerization, equipped with an anchor stirrer with magnetic stirrer drive above the top of autoclave and a valve at the base of the autoclave to withdraw polymer. The temperature was regulated using steam/water via the outer jacket of the autoclave. A fluidized seed particle of polymer (400 g) and 60 g of the ethylene prepolymer previously prepared in (b) were introduced into the gas phase polymerization reactor under nitrogen atmosphere, provided with a stirring device rotating at 150 rpm and heated to 60° C. Nitrogen and hydrogen were charged into the reactor to provide total pressure of 3-5 bars and a given ratio of hydrogen and ethylene ($P_{H2}/P_{C2}$) partial pressure. After the reactor temperature was raised to 85° C., ethylene (5-7 bars) was charged into the reactor to obtain total pressure of 10 bars, together with 1-hexene ($C_6$) at a given $C_6/C_2$ molar ratio. The copolymerization was maintained at 85° C. The feed of $C_6/C_2$ was continued at a given $C_6/C_2$ molar ratio until 1000 g of ethylene was consumed during the gas phase polymerization. The reactor was then cooled down and degassed and an ethylene/1-hexene polymer free from agglomerate was drawn off. The polymer was collected for property tests.

Examples 7 and 8 are ethylene/1-hexene copolymers produced by using commercial gas phase process in accordance with the following general procedure. Polymerization was conducted in a commercial BP process fluidized bed gas phase reactor operating at approximate 300 psig total pressure. Fluidizing gas was passed through the bed at a velocity of approximate 1.8 feet per second. The fluidizing gas exiting the bed entered a resin disengaging zone located at the upper portion of the reactor. The fluidizing gas the entered a recycle loop and passed through a cycle gas compressor and water-cooled heat exchanger. The shell side water temperature was adjusted to maintain the reaction temperature to the specified value in the range of from 175° F. to 195° F. Ethylene, hydrogen, 1-hexene, and nitrogen were fed to the cycle gas loop just upstream of the compressor at quantities sufficient to maintain the desired gas composition. Gas compositions were measured by an on-line GC analyzer. The catalyst in the form of prepolymer prepared in (b), with a mixed cocatalyst from a 1:1 to 1:1.5 ratio of TEAL to EADC in Example 7 and Example 8, respectively, was injected to the reactor bed through a stainless steel injection tube at a rate sufficient to maintain the desired polymer production rate. Nitrogen gas was used to disperse the catalyst into the reactor. Product was withdrawn from the reactor, polymer was collected after discharging and degassing in the downstream, gases were recycled in the loops and residual catalyst and cocatalyst in the resin was deactivated with a wet nitrogen purge. Final powder product (polymer) was transferred into extrusion and pelletized into granular product.

Comparative Examples 1-3 is ethylene/1-hexene copolymer or linear low density polyethylene prepared in the same manner as described in Examples 1-6 except that cocatalysts used are TEAL, TnOA, and MAO, respectively.

Comparative Example 4 is commercial super-hexene resin. Comparative Example 5 is commercial 1-octene/ethylene LLDPE resin (C8-LLDPE). Comparative Example 6 is commercial metallocene ethylene-1-hexene copolymer resin (m-LLDPE). Comparative Example 7 is commercial LLDPE prepared by BP fluidized gas phase process in the same manner as described in Example 7 except that prepolymerized catalyst or prepolymer is prepared with TnOA cocatalyst (without a halogenated aluminium alkyl or organohalogenous aluminum compounds).

Granular products for Examples 1-8 and Comparative Examples 1-3, and 7 were screened and dry-blended with suitable additives such as Irganox-1076, TNPP, Eurmide, Zinc stearate, and Polybloc Talc. Pelletizing of Examples 1-7 and Comparative Examples 1-2, and 7 was carried out on a twin-screw extruder equipped with an underwater pelletizer, with melt temperature of 420-445° F.

Table 1 shows the results of ethylene/1-hexene copolymerization with catalyst prepared as described under Examples a) and cocatalyst TEAL or TnOA or a halogenated aluminium alkyl compounds such as TEAL/EADC mixture or MAO/EADC mixture. The commercial 1-octene/ethylene LLDPE resin and commercial metallocene ethylene-1-hexene copolymer resin (m-LLDPE) is used for comparison.

Combination of catalyst with TEAL, TnOA, TEAL/EADC mixture, and MAO/EADC mixture cocatalyst produced polymer powder with high bulk density. The polymers showed a quite good bulk density of over 0.35 g/ml. However, catalyst system with TEAL cocatalyst showed low activity and high static in the gas phase reactor, which results in reactor fouling. Catalyst system with EADC cocatalyst has very low activity, which cannot be operative in gas phase reactor to produce polymer.

Figure 2:
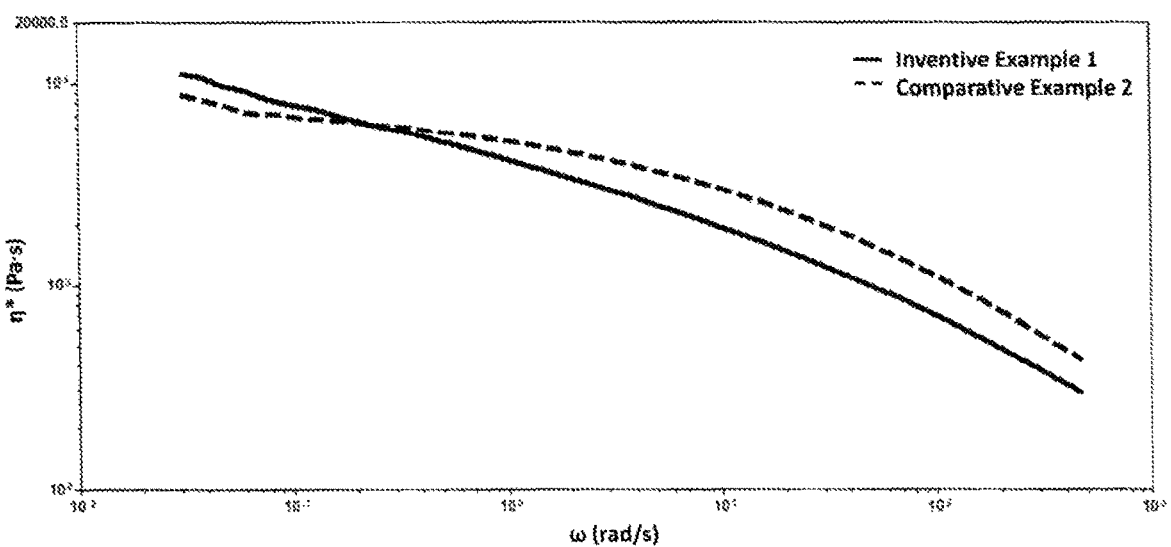
FIG. 2 depicts rheological curves for Inventive Example 1 and Comparative Example 2.
Figure 3:
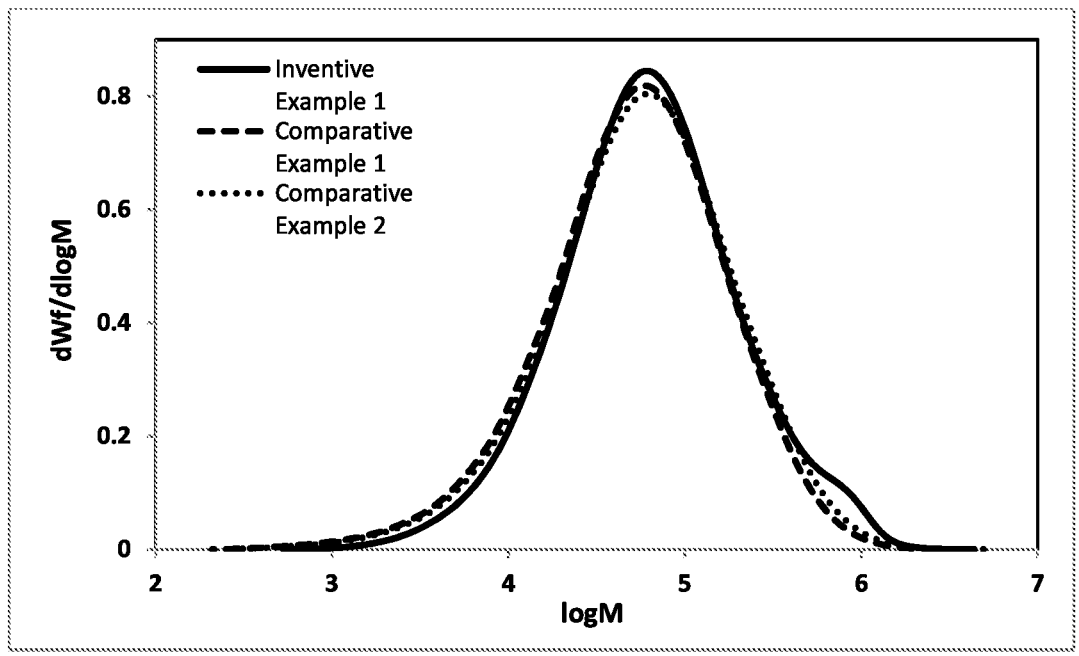
FIG. 3 depicts GPC curves of Inventive Example 1 and Comparative Examples 1 and 2.
Figure 4:
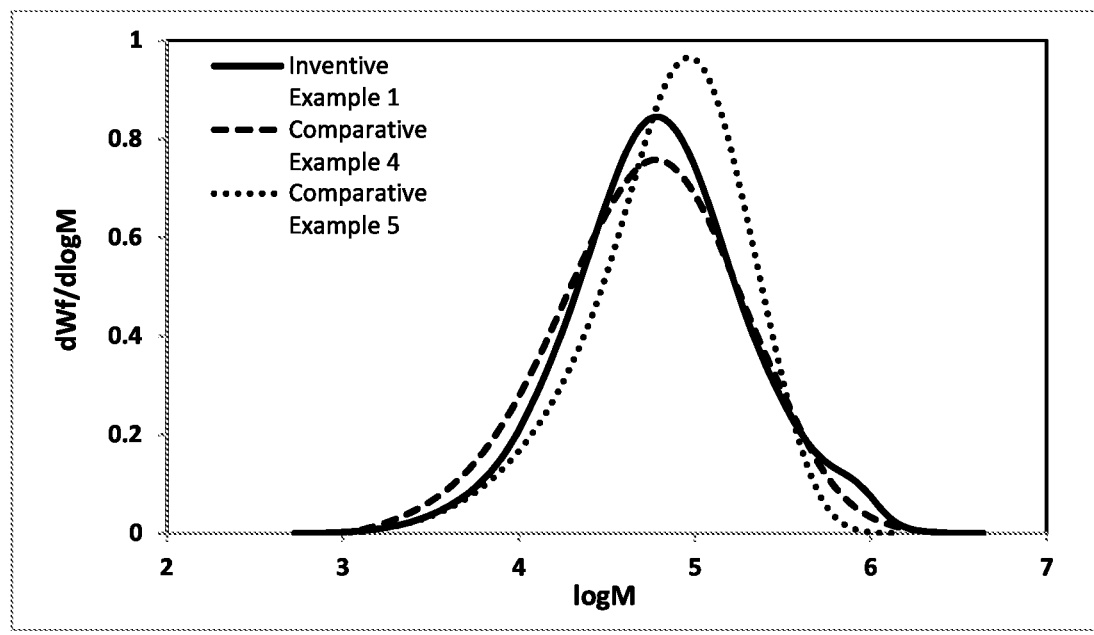
FIG. 4 depicts GPC curves of Inventive Example 1 and Comparative Examples 4 and 5.

Table 1 compares the properties of polymers from different cocatalysts. FIG. 1 and FIG. 2 compares the rheological behavior of polymers prepared by advanced Ziegler-Natta catalyst with different cocatalysts TEA/EADC mixture vs. TEAL, and TEA/EADC vs. TnOA, respectively. Obviously the inventive examples prepared with cocatalyst TEA/EADC mixture or MAO/EADC mixture show improved shear shinning behavior and higher melt strength index (MSI), which can further enhance processability and increase extrusion rate. FIG. 3 and FIG. 4 compares the GPC curves of polymers from different cocatalysts. The inventive examples from a halogenated aluminum alkyl compounds as cocatalyst such as TEAL/EADC mixture or MAO/EADC mixture show high molecular weight tail and high $M_z/M_w$ ratio, as compared to the comparative examples from TnOA, TEAL, and commercial ZN-based C2/C8 LLDPE and commercial m-LLDPE.

Figure 5:
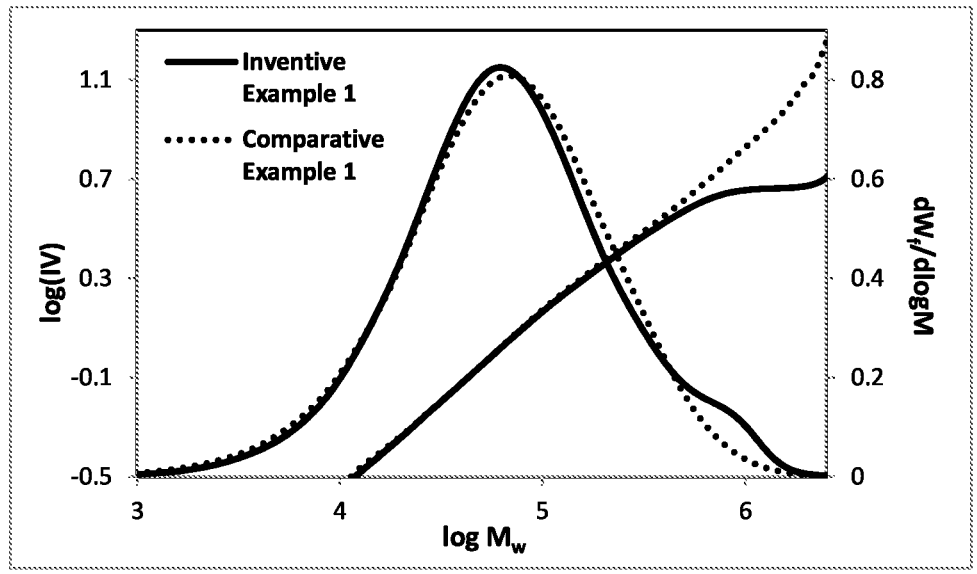
FIG. 5 depicts curves of intrinsic viscosity and $dW_f/d(\log M)$ as a function of molecular weight for Inventive Example 1 and Comparative Example 1.
Figure 6:
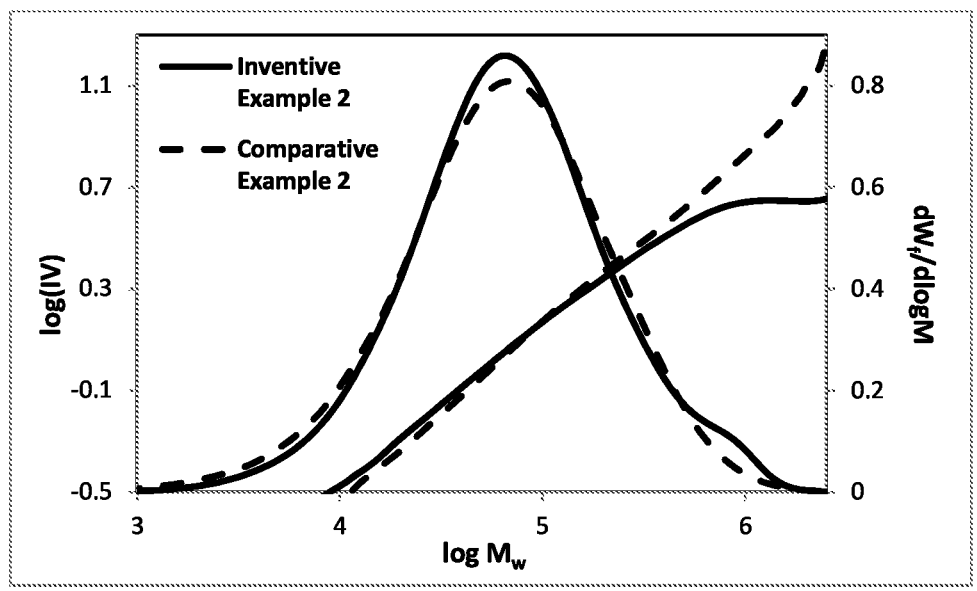
FIG. 6 depicts curves of intrinsic viscosity and $dW_f/d(\log M)$ as a function of molecular weight for the Inventive Example 1 and the Comparative Example 2.
Figure 7A:
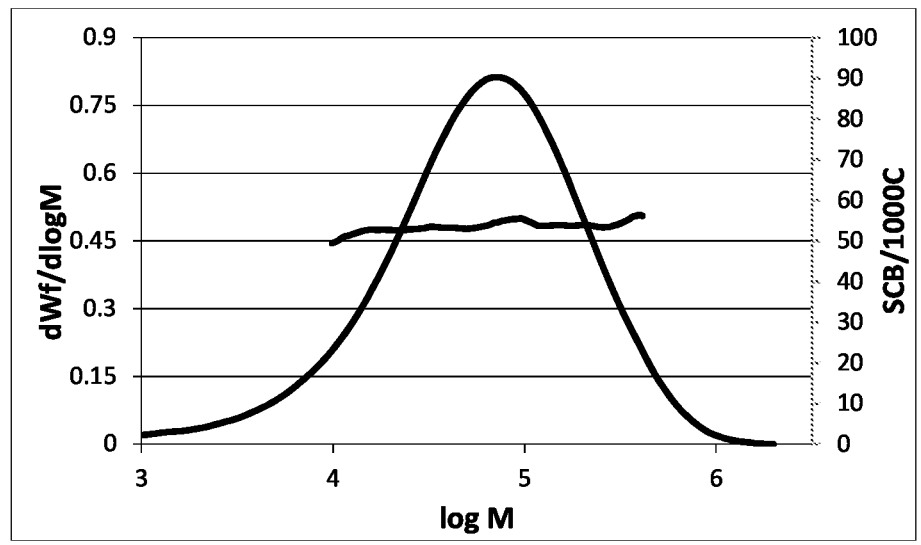
FIG. 7a is the GPC-FTIR curve for SCBD profile across its molecular weight distribution (MWD) in the fraction eluted at temperature of less than 35° C.
Figure 7B:
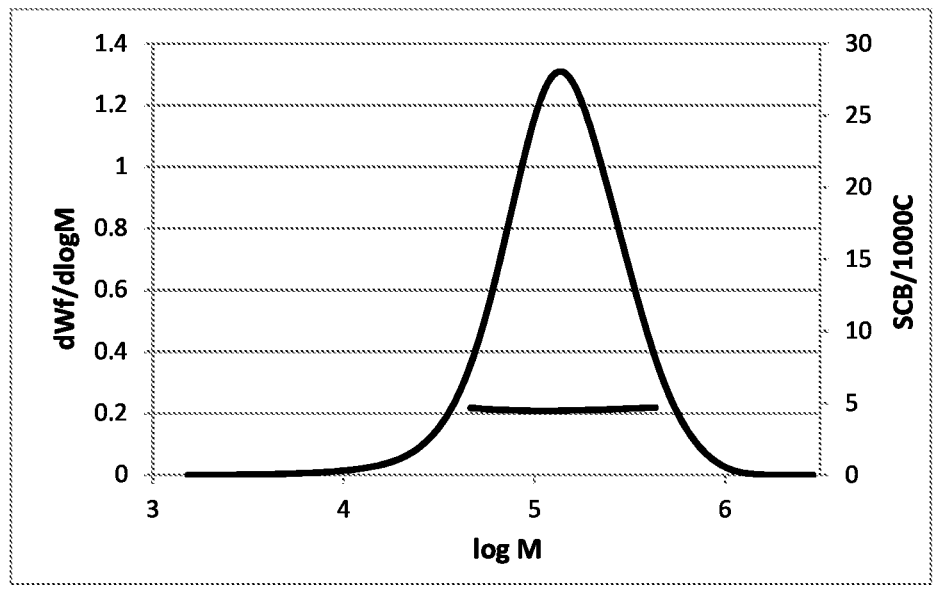
FIG. 7b is the GPC-FTIR curve for SCBD profile across its molecular weight distribution (MWD) in the fraction eluted at temperature of 35-94° C.
Figure 7C:
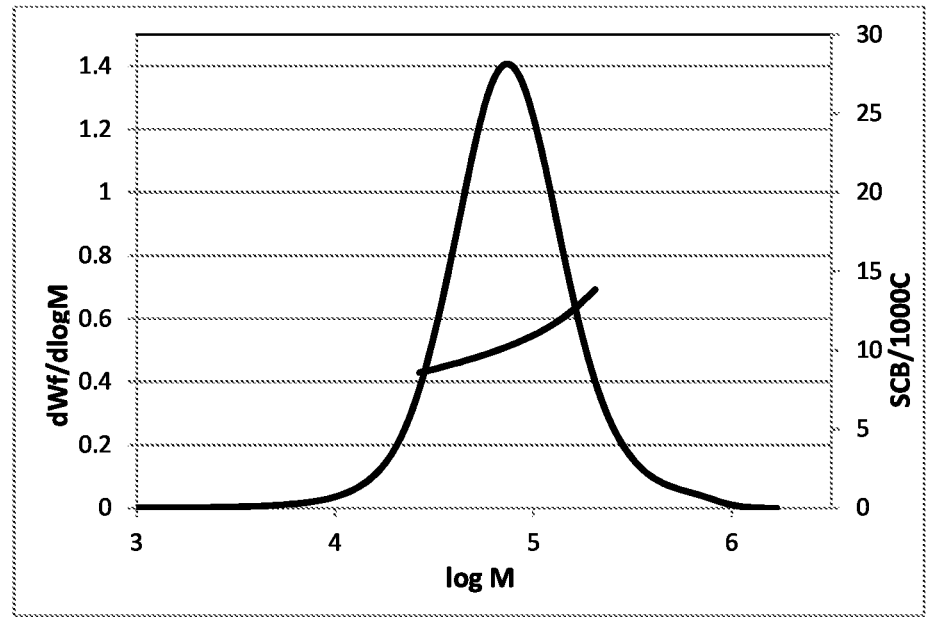
FIG. 7c is the GPC-FTIR curve for SCBD profile across its molecular weight distribution (MWD) in the fraction eluted at temperature of 94-100° C.
Figure 7D:
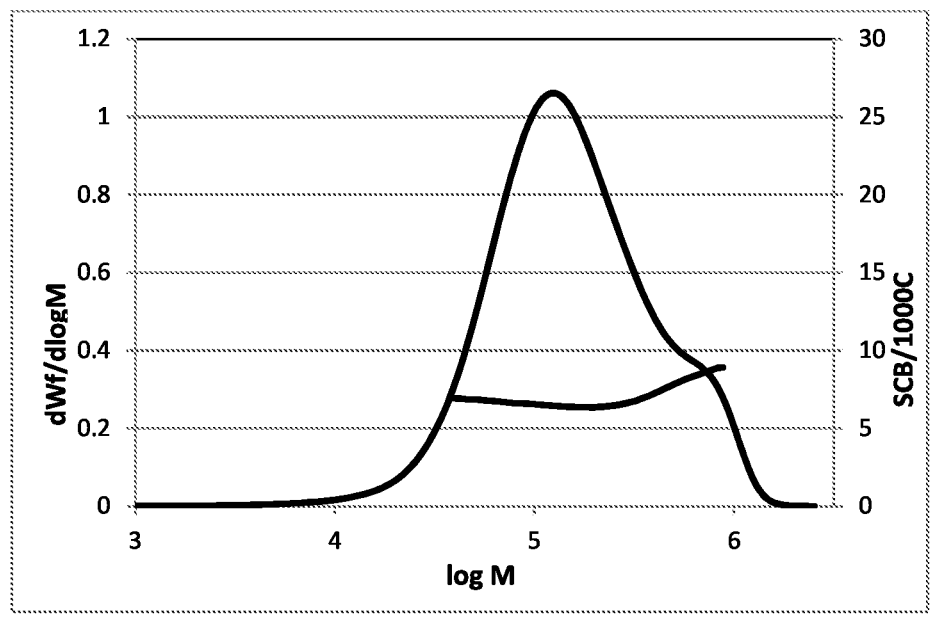
FIG. 7d is the GPC-FTIR curve for SCBD profile across its molecular weight distribution (MWD) in the fraction eluted at temperature of over 100° C.

The inventive polymers prepared by the combination of above-mentioned catalyst with a halogenated aluminum alkyl compounds as cocatalyst such as TEA/EADC mixture or MMAO/EADC mixture have sporadic long chain branches in high molecular weight portions. By contrast, the comparative examples from TnOA, TEAL, and commercial ZN-based C8-LLDPE and commercial m-LLDPE do not show any long chain branches, even at high molecular weight portions (FIG. 5 and FIG. 6). Also, there is no sporadic long chain branches contained in the polymer reported in U.S. Pat. Nos. 6,043,326 and 8,546,499 by using a mixed cocatalyst of TEAL/EADC or TEA/DEAC. The curves of log(IV) vs log M for the inventive samples show linear relationship at moderate molecular weight fractions (<300,000 g/mol), but deviate linear relationship at high molecular weight fractions because the long chain branches occurring in very long polymer chains reduce gyration of radius. In contrast, the curve of log(IV) vs log M for the comparative examples show linear relationship in all the measurement range of molecular weight fractions, indicating the polymer chains are linear and free of long chain branches. The long chain branches account for the optical properties and processability improvement of the inventive polymers. As expected, a low level of long chain branches was obtained with less than 1 per $10^6$ total carbon atoms in the polymer composition to maintain excellent physical properties (such as dart impact resistance and MD tear strength), but to improve polymer processability.

From Table 1 and Table 2 it can be seen that the inventive polymer prepared in commercial BP process gas phase reactor has novel polymer composition, wherein polymer has unique rheology behavior (higher MSI), and long chain branching structure (defined as JC-α), which improve the extrusion processability and film optical properties (haze % and clarity). Therefore, as compared to polymer composition (with TnOA cocatalyst) reported in Assignee's prior U.S. Pat. Nos. 8,993,693, and 9,487,608, the inventive polymer prepared with a halogenated aluminum alkyl compounds as cocatalyst such as TEA/EADC mixture has the improved melt strength (even better than comparable to commercial C8-LLDPE), and excellent optical properties on par with commercial m-LLDPE and commercial C8-LLDPE.

TREF curves of the ethylene/1-hexene copolymers produced with the catalyst and cocatalyst a halogenated aluminum alkyl compounds such as TEA/EADC mixture or MMAO/EADC mixture were compared to TREF curves of the copolymers obtained with TEAL or TnOA as cocatalyst by integrating the elution areas according to elution temperature (Table 3).

The results from Table 3 demonstrate clearly that there was a decrease in the short chain branching comonomer fraction (very low density fraction) eluted below 30° C. or 40° C., and a corresponding increase in the comonomer fraction eluted between 60° C. and 94° C., which indicates a good chemical composition distribution (CCD) when the mixed cocatalyst was used. Moreover, when using mixed catalyst containing a halogenated aluminum alkyl compound, the fraction eluted between 94° C. and 102° C. also decrease, while new fraction eluted over 102° C. was obtained to balance physical properties. Overall, the new polymer composition in the invention is different from that reported in Assignee's prior U.S. Pat. Nos. 8,993,693, and 9,487,608 by using TnOA as cocatalyst, and also different from composition reported in U.S. Pat. Nos. 6,043,326 and 8,546,499 by using a mixed cocatalyst from a 1:1 mixture of TEAL/EADC or TEA/DEAC.

Table 4 lists average weight molecular weight ($M_w$) of each fraction eluted from temperatures of 30-102° C. When the mixed cocatalyst containing a halogenated aluminum alkyl compound was used, The M. of all fractions is obviously increased. In particular, fraction containing higher short chain branching commoner (very low density fraction) eluted below 35° C. has high molecular weight of over 100,000 g/mol similar to other fractions eluted from temperatures from 35-94° C., and fraction eluted at 100° C. or higher (at least 5.0 wt % of a crystallizing polymer component) has very high molecular weight of over 150,000 g/mol. This is one of reasons that new polymer composition in the invention has improved mechanical properties (Table 5).

Short chain branching distribution of all fractions eluted from the temperatures of 20-130° C. was measured by GPC-FTIR. (FIG. 7a-FIG. 7d). From these GPC-FTIR results it can be clearly seen that polymer composition in the invention has a substantially constant distribution of short chain branching profile across its molecular weight distribution (MWD) in each fraction over elution temperature range from 30° C. to 94° C., indicating very homogeneous comonomer composition distribution as a function of molecular weight, especially in the fraction eluted at 35° C. As compared to TnOA cocatalyst reported in Assignee's prior U.S. Pat. Nos. 8,993,693, and 9,487,608, when using a mixed cocatalyst containing a halogenated aluminum alkyl compound, a high molecular weight tail in the fractions over elution temperature range from 100° C. to 130° C. was achieved, and fractions with a high molecular weight tail demonstrated a reversed distribution of comonomer composition profile across the molecular weight distribution.

The unique polymer structure of the present invention provides it with advantages in certain properties over other comparative polymers. As shown in Table 5, the inventive resin from TEAL/EADC, MAO/EADC (in combination with advanced Ziegler-Natta catalysts disclosed) has a superior balance of physical properties and optical properties.

Compared to the resin from TnOA or TEAL, the inventive resins show enhanced processability (even better than commercial C8-LLDPE), and improved optical properties (low haze, high clarity and high gloss) on par with those of C8-LLDPE and mLLDPE polymers, while it still maintains excellent MD tear strength, outstanding toughness (e.g. dart impact), and stiffness (secant modulus at 1% strain).

As such, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations are considered within the scope and spirit of the present invention. Whenever a numerical range with a lower limit and an upper limit is disclosed, any number falling within the range is specifically disclosed. Moreover, the indefinite articles "a" or "an", as used in the claims, are defined herein to mean one or more than one of the element that it introduces.

TABLE 1

|  | Example 1 | Example 2 | Example 3 | Example 4 | Example 5 | Example 6 |
| --- | --- | --- | --- | --- | --- | --- |
| Cocatalyst | TEAL/EADC | TEAL/EADC | TEAL/EADC | TEAL/EADC | MAO/EADC | MAO/EADC |
| TEAL/EADC ratio | 1:1 | 1:1 | 1:1 | 1.2:1 | 1:1 | 1.2:1 |
| MI, g/10 min | 0.89 | 0.95 | 0.90 | 0.96 | 0.85 | 0.67 |
| Bulk Density, g/ml | 0.365 | 0.371 | 0.385 | 0.361 | 0.382 | 0.385 |
| Resin Density, g/ml | 0.9181 | 0.9197 | 0.9205 | 0.9181 | 0.9181 | 0.9188 |
| Mw/Mn | 4.5 | 4.5 | 4.4 | 4.4 | 4.4 | 4.5 |
| Mz/Mw | 3.9 | 3.9 | 3.5 | 3.7 | 3.9 | 4.2 |
| Tm, °C. | 124.5 | 124.9 | 125.3 | 124.4 | 124.2 | 124.1 |
| MSI | 0.21 | 0.19 | 0.18 | 0.18 | 0.35 | 0.33 |
| JC-α | 0.30 | 0.26 | 0.27 | 0.13 | 0.65 | 0.60 |
|  | Comparative Example 1 | Comparative Example 2 | Comparative Example 3 | Comparative Example 4 | Comparative Example 5 | Comparative Example 6 |
| Cocatalyst | TEAL | TnOA | MAO | Super-hexene | C8-LLDPE | m-LLDPE |
| TEAL/EADC ratio |  |  |  |  |  |  |
| MI, g/10 min | 0.90 | 0.80 | 0.80 | 0.95 | 0.98 | 0.96 |
| Bulk Density, g/ml | 0.360 | 0.351 | 0.365 | — | — | — |
| Resin Density, g/ml | 0.9205 | 0.9198 | 0.9207 | 0.9215 | 0.9215 | 0.9206 |
| Mw/Mn | 3.7 | 3.6 | 3.7 | 3.8 | 4.1 | 2.6 |
| Mz/Mw | 2.8 | 2.9 | 2.9 | 2.8 | 3.2 | 1.9 |
| Tm, °C. | 124.5 | 124.7 | 124.2 | 123.5 | 121.4 | 118.0 |
| MSI | 0.08 | 0.10 | 0.09 | 0.08 | 0.10 | 0.02 |
| JC-α | 0 | 0 | 0 | 0 | 0 | 0 |

TABLE 2

| Sample | Inventive Example 7 | Inventive Example 8 | Comparative Example 7 | Comparative Example 5 (C8-LLDPE) | Comparative Example 6 (m-LLDPE) |
| --- | --- | --- | --- | --- | --- |
| Cocatalyst | TEAL/EADC | TEAL/EADC | TnOA | — | MAO |
| TEAL/EADC Ratio | 1:1 | 1.5:1 | — | — | — |
| H2/C2 ratio | 0.325 | 0.241 | 0.245 | — | — |
| MI (g/10 min) | 0.73 | 0.71 | 0.84 | 0.96 | 0.96 |
| Density (g/mL) | 0.9221 | 0.9214 | 0.9218 | 0.9262 | 0.9213 |
| $M_w/M_n$ | 4.3 | 4.2 | 3.7 | 4.0 | 2.9 |
| $M_z/M_w$ | 3.29 | 3.29 | 2.63 | 3.07 | 1.89 |
| $T_m$ (°C.) | 125 | 125 | 125 | 122 | 119 |
| MSI | 0.18 | 0.17 | 0.10 | 0.10 | 0.02 |
| JC-α | 0.20 | 0.18 | 0 | 0 | 0 |

TABLE 2-continued

| Sample | Inventive Example 7 | Inventive Example 8 | Comparative Example 7 | Comparative Example 5 (C8-LLDPE) | Comparative Example 6 (m-LLDPE) |
|---|---|---|---|---|---|
| Haze (%) | 11.0 | 12.1 | 22.0 | 11.2 | 11.5 |
| Clarity (%) | 92.0 | 92.4 | 83.5 | 92.3 | 92.8 |

TABLE 3

| Cocatlyst | Example | Density, g/cc | Fraction <30° C. (wt %) | Fraction ≤40° C. (wt %) | Fraction 30-60° C. (wt %) | Fraction 60-94° C. (wt %) | Fraction >94 (wt %) | Fraction >100° C. (wt %) |
|---|---|---|---|---|---|---|---|---|
| TEAL | Comparative Example 1 | 0.9160 | 25.5 | 27.5 | 6.0 | 23.5 | 45.0 | 0 |
| TnOA | Comparative Example 2 | 0.9162 | 19.4 | 21.4 | 6.2 | 37.6 | 36.8 | 0 |
| TEAL/EADC | Example 1 | 0.9160 | 18.8 | 20.7 | 6.6 | 37.2 | 37.4 | 0 |
|  | Example 1 | 0.9160 | 16.5 | 17.1 | 11.1 | 42.5 | 29.9 | 5.5 |
|  | Example 2 | 0.9180 | 14.8 | 16.2 | 10.5 | 45.5 | 29.2 | 5.0 |
|  | Example 3 | 0.9200 | 13.5 | 15.1 | 10.1 | 44.1 | 33.7 | 5.5 |
|  | Example 4 | 0.9161 | 15.1 | 17.5 | 10.5 | 44.5 | 29.9 | 5.5 |
| MAO/EADC | Example 5 | 0.9159 | 15.9 | 17.8 | 13.5 | 44.6 | 28.0 | 6.5 |
|  | Example 6 | 0.9161 | 14.5 | 16.7 | 13.2 | 45.0 | 27.3 | 6.2 |

TABLE 4

| Samples | Comparative Example 1 | Comparative Example 2 | Example 1 | Example 5 |
|---|---|---|---|---|
|  | TEAL | TnOA | TEAL/EADC (1:1) | MAO/EADC (1:1) |
|  | GPC $M_w$ | GPC $M_w$ | GPC $M_w$ | GPC $M_w$ |
| Fraction <35° C. | 21,914 | 93,098 | 102,019 | 105,359 |
| Fraction 35-60° C. | 91,510 | 99,100 | 99,124 | 98,639 |
| Fraction 60-94° C. | 133,149 | 120,808 | 120,583 | 124,534 |
| Fraction 94-100° C. | 138,595 | 138,913 | 132,570 | 130,108 |
| Fraction >100° C. | nil | nil | 163105 | 163,927 |

TABLE 5

|  | Example 1 | Example 3 | Example 6 | Comparative Example 2 | Comparative Example 4 | Comparative Example 5 | Comparative Example 6 |
|---|---|---|---|---|---|---|---|
| Cocatalyst | TEAL/EADC | TEAL/EADC | MAO/EADC | TnOA | Super-hexene | C8-LLDPE | m-LLDPE |
| TEAL/EADC Ratio | 1:1 | 1:1 | 1.2:1 | — | — | — | — |
| Film Gauge Target (mils) | 1.00 | 1.00 | 1.00 | 1.00 | 1.00 | 1.00 | 1.00 |
| Blow-up Ratio (BUR) | 2.5 to 1 | 2.5 to 1 | 2.5 to 1 | 2.5 to 1 | 2.5 to 1 | 2.5 to 1 | 2.5 to 1 |
| TEAR STRENGTH MD, g/mil | 465 | 497 | 454 | 506 | 413 | 342 | 241 |
| TEAR STRENGTH TD, g/mil | 578 | 564 | 561 | 647 | 712 | 663 | 581 |
| DART IMPACT, g/mil | 555 | 544 | 589 | 658 | 293 | 270 | 924 |
| Film HAZE, % | 11 | 12 | 8 | 22 | 27 | 11 | 11 |
| Film Clarity, % | 92 | 90 | 92 | 84 | 82 | 92 | 93 |
| Film Gloss, 45° | 74 | 73 | 80 | 56 | 46 | 74 | 73 |
| Tensile Str. @ Brk (MD), psi | 5443 | 5456 | 4494 | 5639 | 5395 | 3863 | 3122 |
| Tensile Str. @ Brk (TD), psi | 4776 | 4369 | 3969 | 4960 | 4347 | 2760 | 3094 |
| Film Elongation @ Brk (MD) % | 643 | 711 | 652 | 672 | 591 | 652 | 534 |
| Film Elongation @ Brk (TD) % | 774 | 783 | 632 | 884 | 715 | 865 | 546 |
| (MD) SEC. MOD @ % STRN, % | 17890 | 18592 | 17288 | 18156 | 18693 | 18311 | 18027 |
| (TD) SEC. MOD @ % STRN, % | 20223 | 19356 | 19635 | 19549 | 19837 | 18994 | 17910 |

What is claimed is:

1. A Ziegler-Natta catalyzed ethylene/alpha-olefins copolymer, wherein the copolymer comprises the following properties:
   density of between 0.890 and 0.935 g/cc;
   C4-C10 comonomer content of between 1 and 20 wt %;
   melt index (I2) of between 0.5 and 10 dg/min;
   ratio ($M_z/M_w$) of z-average molecular weight (Mz) to weight average molecular weight (Mw) of between 3.0 and 10;
   melting point over 124° C. across the density of 0.890 to 0.935 g/cc;
   sporadic long chain branches with J-C a value of less than 5;
   melt strength index, defined as the ratio of storage modulus to loss modulus (G'/G") at a shear rate of 0.03 $s^{-1}$, is less than 5;
   weight average molecular weight Mw of less than 200,000 g/mol;
   a fraction soluble below about 30° C. of greater than 12 wt %, determined by CRYSTAF, having a weight average molecular weight Mw of higher than 90,000 g/mol, determined by gel permeation chromatography (GPC);
   a fraction soluble between about 60° C. and 75° C. of less than 35 wt %, determined by CRYSTAF;
   greater than 13.5 wt % of a polymer component having an elution temperature below about 30° C., determined by temperature rising elution fractionation (TREF) analysis;
   greater than 15 wt % of a polymer component having an elution temperature below about 40° C., determined by TREF analysis, and an average high molecular weight of greater than 90,000 g/mol, determined by GPC analysis;
   greater than 10 wt % of a polymer component having an elution temperature range from about 30° C. to 60° C., determined by TREF analysis;
   less than 50 wt % of a polymer component having an elution temperature range from about 60° C. to 94° C., determined by TREF analysis;
   greater than 25 wt % of a polymer component having an elution temperature higher than about 94° C., determined by TREF analysis;
   a substantially constant distribution of short chain branching across its molecular weight distribution (MWD) in each fraction over the elution temperature range from about 30° C. to 94° C., determined by GPC coupled with Fourier Transform Infrared Spectroscopy Detector (GPC-FTIR); and
   a reversed distribution of comonomer composition across the molecular weight distribution in the fractions eluted over about 94° C., determined by GPC-FTIR analysis; and
   a high molecular weight tail in the fractions over the elution temperature range over about 100° C.

2. The copolymer of claim 1, wherein the alpha-olefin is 1-hexene.

3. The copolymer of claim 1, wherein the molecular weight of the copolymer satisfies the formula: (Mw of 100° C.)/(Mw of 35° C.)=1.0 to 1.3.

4. The copolymer of claim 1, wherein the copolymer has a sporadic long chain branches with J-C a value of less than 1.

5. The copolymer of claim 1, wherein the copolymer has a melt strength index, defined as the ratio of storage modulus to loss modulus (G'/G") at a shear rate of 0.03s-1, is less than 3.

6. The copolymer of claim 1, wherein the copolymer has a ratio (Mz/Mw) of z-average molecular weight (Mz) to average weight molecular weight (Mw) of between 3.2 and 4.5.

7. The copolymer of claim 1, wherein the molecular weight (Mw) of the fractions eluted over about 100° C. is higher than 200,000 g/mol.

8. The copolymer of claim 1, wherein the fractions eluted over about 100° C. is at least 5 wt % of a crystallizing polymer component.

9. The copolymer of claim 1, wherein the copolymer is prepared by copolymerizing ethylene with one or more higher alpha-olefin comonomers in the presence of a Ziegler-Natta catalyst system comprising:
   a catalyst precursor comprising Ti, Mg, Si, halogen, and nitrogen; and
   a cocatalyst selected from containing halogenated aluminum alkyl or organohalogenous aluminum compounds.

10. The copolymer of claim 9, wherein the catalyst precursor is prepared by contacting a magnesium-based composite support with an organic silicon complex, a transition metal compound, a transition metal halide compound, a substituted aromatic compound containing nitrogen, and an alkyl halide or aromatic halide.

11. The copolymer of claim 10, wherein the magnesium-based composite support is prepared by contacting metallic magnesium with an alkyl halide or aromatic halide in the presence of an organic silicon compound having the formula $R^1_m Si(OR^2)_m$ wherein $R^1$ and $R^2$ are $C_1$-$C_{20}$ hydrocarbyl, m=0-3, n=1-4, and m+n=4, and wherein each $R^1$ and each $R^2$ may be the same or different.

12. The copolymer of claim 11, wherein the organic silicon complex is prepared by reacting an alkoxysilane ester with a halogen-substituted silane.

13. The copolymer of claim 12, wherein the alkoxysilane ester has the formula $R^2_m Si(OR^3)_n$, wherein $R^2$ and $R^3$ are independently selected from any $C_1$-$C_{20}$ hydrocarbyl, m is 0-3, n is 1-4, and m+n=4.

14. The copolymer of claim 12, wherein the halogen-substituted silane has the formula $R^3_x SiX_y$, wherein $R^3$ is $C_1$-$C_{20}$ hydrocarbyl, X is halogen, x=0-3, y=1-4, and x+y=4, and wherein each X and each $R^3$ may be the same or different.

15. The copolymer of claim 10, wherein the transition metal compound has the formula $M(OR^4)_a X_{4-a}$, wherein M is an early transition metal, wherein $R^4$ is $C_1$-$C_{20}$ hydrocarbyl, X is a halogen, and 0≤a≤4.

16. The copolymer of claim 15, wherein the early transition metal is titanium.

17. The copolymer of claim 10, wherein the transition metal halide compound having the formula $MX_4$, wherein M is an early transition metal, and X is a halogen.

18. The copolymer of claim 17, wherein the early transition metal is titanium.

19. The copolymer of claim 10, wherein the substituted aromatic compound containing nitrogen is selected from 2,6-dimethylpyridine, 8-quinolinol, and 2-methyl-8-quinolinol.

20. The copolymer of claim 10, wherein the alkyl halide or aromatic halide has the formula $R^5 X$, wherein $R^5$ is $C_1$-$C_{20}$ hydrocarbyl.

* * * * *